United States Patent
Matsumoto et al.

(10) Patent No.: US 10,975,107 B2
(45) Date of Patent: Apr. 13, 2021

(54) SEQUENCE-CONTROLLED OLIGOSILOXANE AND MANUFACTURING METHOD AND OLIGOSILOXANE SYNTHESIZER THEREFOR

(71) Applicant: NATIONAL INSTITUTE OF ADVANCED INDUSTRIAL SCIENCE AND TECHNOLOGY, Tokyo (JP)

(72) Inventors: Kazuhiro Matsumoto, Tsukuba (JP); Kazuhiko Sato, Tsukuba (JP); Shigeru Shimada, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 16/490,761

(22) PCT Filed: Mar. 1, 2018

(86) PCT No.: PCT/JP2018/007759
§ 371 (c)(1),
(2) Date: Sep. 3, 2019

(87) PCT Pub. No.: WO2018/159756
PCT Pub. Date: Sep. 7, 2018

(65) Prior Publication Data
US 2020/0079803 A1    Mar. 12, 2020

(30) Foreign Application Priority Data

Mar. 2, 2017 (JP) .............................. JP2017-039778
Jan. 25, 2018 (JP) .............................. JP2018-010706

(51) Int. Cl.
*C07F 7/18* (2006.01)
*C07F 7/21* (2006.01)
*C08G 77/08* (2006.01)

(52) U.S. Cl.
CPC ................ *C07F 7/188* (2013.01); *C07F 7/21* (2013.01); *C08G 77/08* (2013.01)

(58) Field of Classification Search
CPC ............. C07F 7/188; C07F 7/21; C08G 77/08
See application file for complete search history.

(56) References Cited

U.S. PATENT DOCUMENTS 4,160,775 A    7/1979   Schilling, Jr.
5,188,903 A *  2/1993   Liao ........................ C07F 7/21
                                                      428/447

(Continued)

FOREIGN PATENT DOCUMENTS

CN   108164704 A  *  6/2018
JP       3-234768       10/1991
(Continued)

OTHER PUBLICATIONS

G. Hussmann et al. 105 Journal of the American Chemical Society, 1263-1269 (1983) (Year: 1983).*

(Continued)

*Primary Examiner* — Alexander R Pagano
(74) *Attorney, Agent, or Firm* — Wenderoth, Lind & Ponack, L.L.P.

(57) ABSTRACT

The purpose of the present invention is to provide a method for producing an oligosiloxane and an oligosiloxane synthesizer, by which an oligosiloxane can be efficiently produced. An oligosiloxane can be efficiently produced by the method for producing an oligosiloxane, which includes a condensation step for generating a hydrosiloxane having a structure represented by the following Formula (d) by reacting an alkoxysilane having a structure represented by the following Formula (b) with a hydrosilane having a structure represented by the following Formula (c) in the presence of a boron compound having Lewis acidity, and a hydrosilylation step for generating an alkoxysiloxane having a structure represented by the following Formula (f) by reacting the hydrosiloxane having the structure represented by Formula (d) generated in the condensation step with a carbonyl compound represented by the following Formula (E) in the presence of a boron compound having Lewis acidity. Moreover, an oligosiloxane having arbitrary substituent sequences can be produced.

(Continued)

-continued

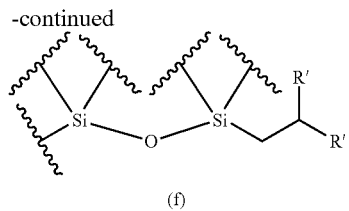

(f)

17 Claims, 1 Drawing Sheet

(56) References Cited

U.S. PATENT DOCUMENTS

| | | | |
|---|---|---|---|
| 5,206,328 A | 4/1993 | Okamura et al. | |
| 5,359,109 A | 10/1994 | Ritcher et al. | |
| 6,043,388 A | 3/2000 | Perry | |
| 2004/0127668 A1 | 7/2004 | Rubinsztajin et al. | |
| 2004/0186259 A1* | 9/2004 | Brehm | C08G 77/38 528/25 |
| 2005/0256286 A1* | 11/2005 | Asch | C08G 77/12 528/31 |
| 2006/0041097 A1* | 2/2006 | Herrwerth | C08G 77/08 528/14 |
| 2020/0001285 A1* | 1/2020 | Nagashima | C07F 7/08 |
| 2020/0347082 A1* | 11/2020 | Fukaya | B01J 8/082 |

FOREIGN PATENT DOCUMENTS

| | | | | |
|---|---|---|---|---|
| JP | 7-179480 | | 7/1995 | |
| JP | 2000-191791 | | 7/2000 | |
| JP | 2002-60393 | | 2/2002 | |
| JP | 2016008176 A | * | 1/2016 | |
| JP | 2016-155771 | | 9/2016 | |
| KR | 20180129333 A | * | 12/2018 | |
| WO | 2006/020752 | | 2/2006 | |
| WO | 2017/047652 | | 3/2017 | |
| WO | WO-2017047652 A1 | * | 3/2017 | C08G 77/08 |
| WO | 2017/154848 | | 9/2017 | |
| WO | WO-2017154848 A1 | * | 9/2017 | C07F 7/08 |

OTHER PUBLICATIONS

T. Frihed et al., e-EROS Encyclopedia of Reagents for Organic (2013) (Year: 2013).*
J. Chojnowski et al., 24 Organometallics, 6077-6084 (2005) (Year: 2005).*
G. Lázaro et al., 5 Catalysis Science & Technology, 1878-1887 (2015) (Year: 2015).*
English-Language Machine Translation of CN 108164704 A (2018) (Year: 2018).*
English-Language Machine Translation of JP 2016008176 A (2016) (Year: 2016).*
English-Language Machine Translation of KR 20180129333 A (2018) (Year: 2018).*
K. Matsumoto et al., Angew. Chem. Int. Ed. 4637-4643 (2018) (Year: 2018).*
F. Ritter et al., Angew. Chem. Int. Ed. 1818-1822 (2019) (Year: 2019).*
Y. Satoh et al., 7 ACS Catalysis, 1836-1840 (2017) (Year: 2017).*
T. Zheng et al., 35 Organometallics, 3538-3545 (2016) (Year: 2016).*
H. Uchida et al., 112 Journal of the American Chemical Society, 7077-7079 (1990) (Year: 1990).*
International Search Report dated May 29, 2018 in International Application No. PCT/JP2018/007759.
Written Opinion of the International Searching Authority dated May 29, 2018 in International Application No. PCT/JP2018/007759.
Uchida et al., "General Strategy for Systematic Synthesis of Oligosiloxanes Silicone Dendrimers", Journal of American Chemical Society, 1990, vol. 112, pp. 7077-7079.
Chang et al., "Stepwise synthesis of siloxane chains", Chemical Communications, 2004, pp. 206-207.
Chojnowski et al., "Mechanism of the $B(C_6F_5)_3$—Catalyzed Reaction of Silyl Hydrides with Alkoxysilanes. Kinetic and Spectroscopic Studies", Organometallics, 2005, vol. 24, pp. 6077-6084.
Parks et al., "Tris(pentafluorophenyl)boron—Catalyzed Hydrosilation of Aromatic Aldehydes, Ketones, and Esters", Journal of American Chemical Society, 1996, vol. 118, pp. 9440-9441.
Matsumoto et al., "By-Product-Free Siloxane-Bond Formation and Programmed One-Pot Oligosiloxane Synthesis", Angewandte Chemie International Edition, 2017, vol. 56, pp. 3168-3171.
Fouquet et al, "Characterization of ethanolysis products of poly(dimethylsiloxane) species by electrospray ionization tandem mass spectrometry", Rapid Communications in Mass Spectrometry, 2012, vol. 26, pp. 2057-2067.
Kanner et al., "Synthesis and Properties of Siloxane-Polyether Copolymer Surfactants", I & EC Product Research and Development, 1967, vol. 6, pp. 88-92.
Matsumoto et al., "One-Pot Sequence-Controlled Synthesis of Oligosiloxanes", Angewandte Chemie International Edition, 2018, vol. 57, pp. 4637-4641.

* cited by examiner

SEQUENCE-CONTROLLED OLIGOSILOXANE AND MANUFACTURING METHOD AND OLIGOSILOXANE SYNTHESIZER THEREFOR

TECHNICAL FIELD

The present invention relates to an oligosiloxane, and a production method and an oligosiloxane synthesizer therefor, and more specifically an oligosiloxane wherein the substituent sequences of the oligosiloxane are precisely controlled, and a production method and an oligosiloxane synthesizer therefor.

BACKGROUND ART

Siloxane bonds constitute the main skeleton of silicone polymers and functional siloxane compounds, and thus methods for forming siloxane bonds have been actively developed since olden times. However, techniques for synthesizing oligosiloxanes through control over siloxane sequences are limited.

Masamune et al., have achieved stepwise synthesis of siloxane dendrimers through combination of siloxane bond formation by condensation reaction of silanol and chlorosilane in the presence of pyridine with dehydrogenative condensation of hydrosilane and water (see Non-patent Document 1). Meanwhile, Kung et al., have also reported a technique for synthesizing sequence-controlled oligosiloxanes, wherein siloxane bond formation by condensation reaction of silanol and chlorosilane is applied to perform stepwise reaction of silanediol and dichlorosilane (see Non-patent Document 2). However, the availability of silane monomers (chlorohydrosilane and silanediol) to be used for the above reactions is limited and a procedure of removing pyridinium chloride generated after the siloxane bond formation is required. Accordingly, rapid and convenient synthesis of various sequence-controlled oligosiloxanes by these techniques is difficult.

Meanwhile, tris(pentafluorophenyl)borane is known to catalyze the condensation reaction of alkoxysilane and hydrosilane (Patent Document 1 and Non-patent Document 2). Furthermore, this catalyst is also used for hydrosilylation of carbonyl compounds (Non-patent Document 3).

PRIOR ART DOCUMENTS

Patent Document

Patent Document 1: U.S. Unexamined Patent Application Publication No. 2004/0127668

Non-Patent Documents

Non-patent Document 1: H. Uchida, Y. Kabe, K. Yoshino, A. Kawamata, T. Tsumuraya, S. Masamune, J. Am. Chem. Soc. 1990, 112, 7077-7079.

Non-patent Document 2: Z. Chang, M. C. Kung, H. H. Kung, Chem. Commun. 2004, 206-207.

Non-patent Document 3: J. Chojnowski, S. Rubinsztajn, J. A. Cella, W. Fortuniak, M. Cypryk, J. Kurjata, K. Kazmierski, Organometallics 2005, 24, 6077-6084.

Non-patent Document 4: D. J. Parks, W. E. Piers, J. Am. Chem. Soc. 1996, 118, 9440-9441.

SUMMARY OF INVENTION

Technical Problem

An object of the present invention is to provide a method for producing an oligosiloxane and an oligosiloxane synthesizer, by which an oligosiloxane can be efficiently produced, and particularly a method for producing an oligosiloxane and an oligosiloxane synthesizer, by which the substituent sequences of an oligosiloxane can be precisely controlled.

Solution to Problem

As a result of intensive studies to achieve the above object, the present inventors have discovered that through combination of a condensation reaction of an alkoxysilane and a dihydrosilane using a boron compound having Lewis acidity as a catalyst with a hydrosilylation reaction of a hydrosiloxane and a carbonyl compound using a boron compound having Lewis acidity as a catalyst, an oligosiloxane can be efficiently produced. The present inventors have further discovered that through repetition of the condensation reaction and the hydrosilylation reaction alternately, the substituent sequences of thus-obtained oligosiloxanes can be precisely controlled, and thus have completed the present invention.

Specifically, the present invention is as follows.

<1> A method for producing an oligosiloxane, including:

a condensation step for generating a hydrosiloxane having a structure represented by the following Formula (d) by reacting an alkoxysilane having a structure represented by the following Formula (b) with a hydrosilane having a structure represented by the following Formula (c) in the presence of a boron compound having Lewis acidity; and a hydrosilylation step for generating an alkoxysiloxane having a structure represented by the following Formula (f) by reacting the hydrosiloxane having the structure represented by Formula (d) generated in the condensation step with a carbonyl compound represented by the following Formula (E) in the presence of a boron compound having Lewis acidity.

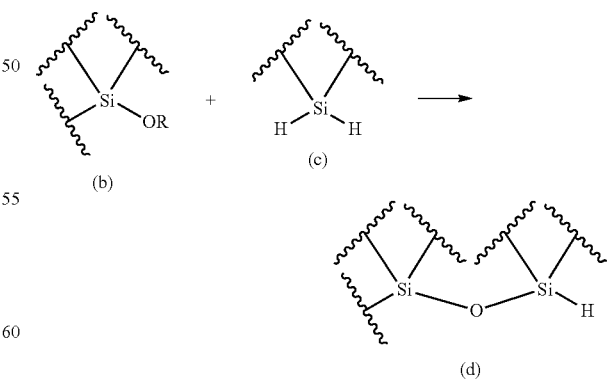

(In Formula (b), R represents a C1-20 hydrocarbon group or a group represented by —CHR'$_2$, and R' each independently represents a hydrogen atom or a C1-8 hydrocarbon group. The structure represented by Formula (b) and the structure represented by Formula (c) may be each contained in different compounds or in one molecule.)

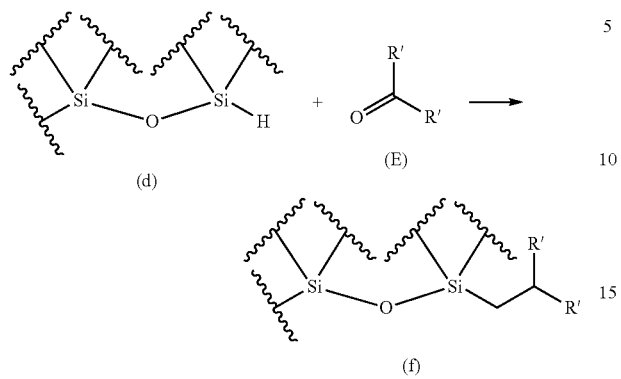

(d)    (E)

(f)

(In Formula (E) and Formula (f), R' each independently represents a hydrogen atom or a C1-8 hydrocarbon group, where two R's in Formula (E) and two R's in Formula (f) are the same combination.)

<2> The method for producing an oligosiloxane according to <1>, wherein
the alkoxysilane having the structure represented by Formula (b) is an alkoxysilane having a structure represented by the following Formula (b'), and
the alkoxysilane having the structure represented by the following Formula (b') is generated by reacting a hydrosilane having a structure represented by the following Formula (a) with a carbonyl compound represented by the following Formula (E) in the presence of a boron compound having Lewis acidity.

(b')

(In Formula (b'), R' each independently represents a hydrogen atom or a C1-8 hydrocarbon group.)

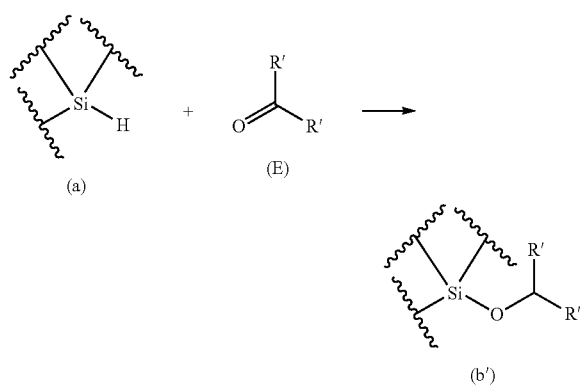

(a)    (E)

(b')

(In Formula (E) and Formula (b'), R' each independently represents a hydrogen atom or a C1-8 hydrocarbon group, where two R's in Formula (E) and two R' in Formula (b') are the same combination.)

<3> A method for producing an oligosiloxane, including:
a hydrosilylation step for generating an alkoxysilane having a structure represented by the following Formula (b') by reacting a hydrosilane having a structure represented by the following Formula (a) with a carbonyl compound represented by the following Formula (E) in the presence of a boron compound having Lewis acidity; and
a condensation step for generating a hydrosiloxane having a structure represented by the following Formula (d) by reacting the alkoxysilane having the structure represented by Formula (b') generated in the hydrosilylation step with a hydrosilane having a structure represented by the following Formula (c) in the presence of a boron compound having Lewis acidity.

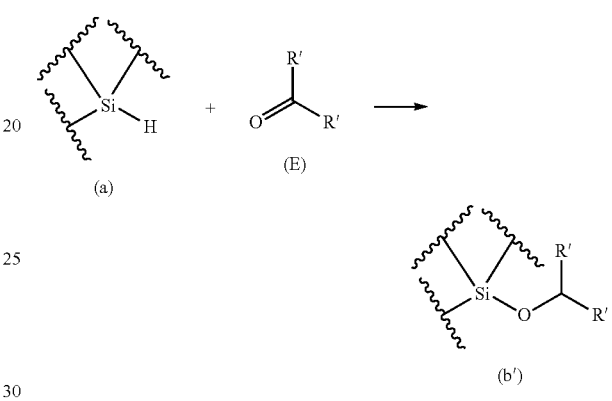

(a)    (E)

(b')

(In Formula (E) and Formula (b'), R' each independently represents a hydrogen atom or a C1-8 hydrocarbon group, where two R's in Formula (E) and two R' in Formula (b') are the same combination.)

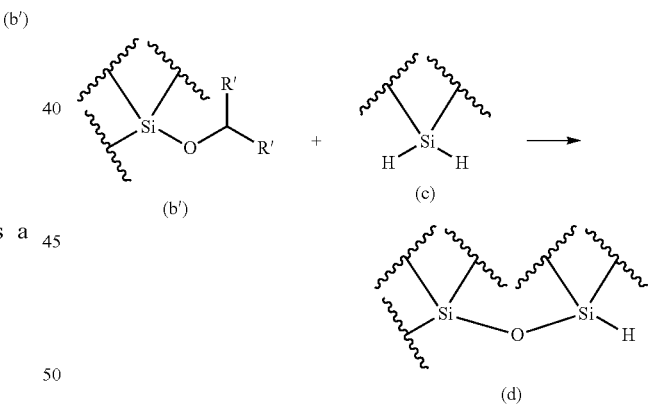

(b')    (c)

(d)

(The structure represented by Formula (b') and the structure represented by Formula (c) may be each contained in different compounds or in one molecule.)

<4> The method for producing an oligosiloxane according any one of <1> to <3>, wherein the condensation step and the hydrosilylation step are performed within one reactor.

<5> The method for producing an oligosiloxane according to any one of <1>, <2> and <4>, wherein the boron compound having Lewis acidity used in the condensation step is used in the hydrosilylation step.

<6> The method for producing an oligosiloxane according to <3> or <4>, wherein the boron compound having Lewis acidity used in the hydrosilylation step is used in the condensation step.

<7> The method for producing an oligosiloxane according to any one of <1> to <6>, wherein the oligosiloxane is represented by any one of the following Formulae (G-1) to (G-14).

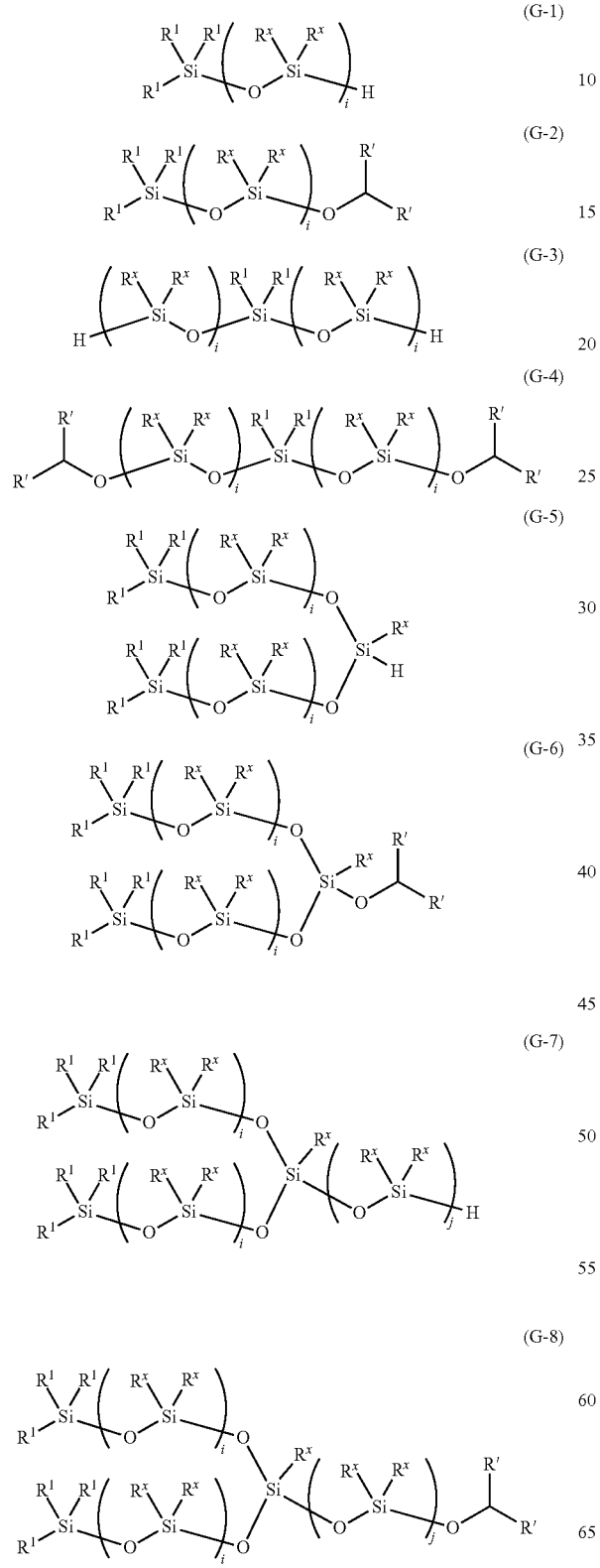

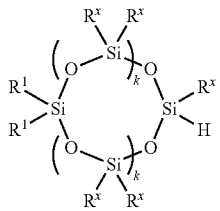

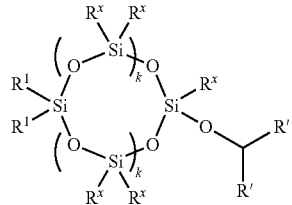

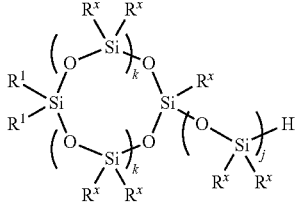

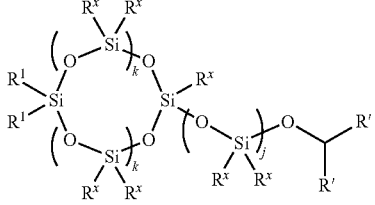

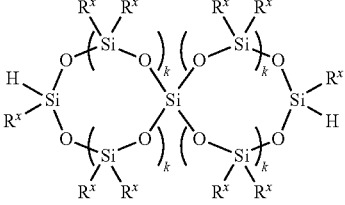

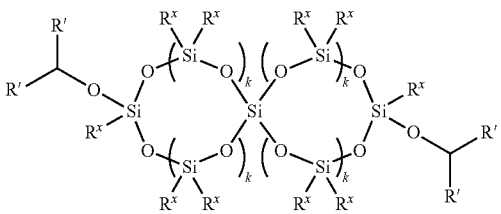

(In Formulae (G-1) to (G-14), $R^1$ each independently represents a C1-20 hydrocarbon group which may contain at least one type of atom selected from the group consisting of a nitrogen atom, an oxygen atom, a sulfur atom, and a halogen atom, R' each independently represents a hydrogen atom or a C1-8 hydrocarbon group, $R^x$ each independently represents a C1-20 hydrocarbon group which may contain at least one type of atom selected from the group consisting of a nitrogen atom, an oxygen atom, a sulfur atom, and a halogen atom, i represents an integer of 2-20, j represents an integer of 1-20, and k represents an integer of 1-20.)

<8> The method for producing an oligosiloxane according to any one of <1> to <7>, including the above two or more condensation steps and the above two or more hydrosilylation steps, wherein the condensation step and the hydrosilylation step are performed alternately.

<9> An oligosiloxane synthesizer for synthesizing an oligosiloxane by performing:

a condensation reaction for generating a hydrosiloxane having a structure represented by the following Formula (d) by reacting an alkoxysilane having a structure represented by the following Formula (b) with a hydrosilane having a structure represented by the following Formula (c) in the presence of a boron compound having Lewis acidity; and a hydrosilylation reaction for generating an alkoxysiloxane having a structure represented by the following Formula (f) by reacting the hydrosiloxane having the structure represented by Formula (d) generated in the condensation reaction with a carbonyl compound represented by the following Formula (E) in the presence of a boron compound having Lewis acidity, which is equipped with:

a reactor for performing the condensation reaction and the hydrosilylation reaction;

a hydrosilane container for storing the hydrosilane having the structure represented by Formula (c);

a carbonyl compound container for storing the carbonyl compound represented by Formula (E);

a hydrosilane transfer mechanism for transferring the hydrosilane having the structure represented by Formula (c) from the hydrosilane container to the reactor;

a carbonyl compound transfer mechanism for transferring the carbonyl compound represented by Formula (E) from the carbonyl compound container to the reactor; and a controller for control operation that involves operating the hydrosilane transfer mechanism to transfer the hydrosilane having the structure represented by Formula (c) from the hydrosilane container to the reactor, and the carbonyl compound transfer mechanism to transfer the carbonyl compound represented by Formula (E) from the carbonyl compound container to the reactor.

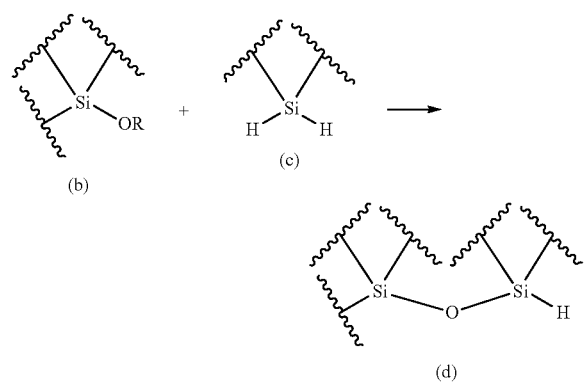

(In Formula (b), R represents a C1-20 hydrocarbon group or a group represented by —CHR'$_2$, and R' each independently represents a hydrogen atom or a C1-8 hydrocarbon group. The structure represented by Formula (b) and the structure represented by Formula (c) may be each contained in different compounds or in one molecule.)

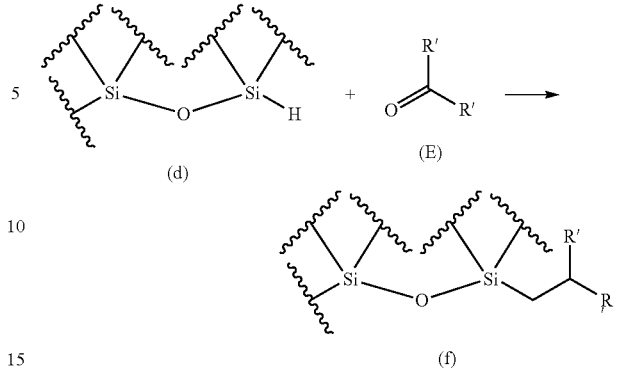

(In Formula (E) and Formula (f), R' each independently represents a hydrogen atom or a C1-8 hydrocarbon group, where two R's in Formula (E) and two R's in Formula (f) are the same combination.)

<10> An oligosiloxane synthesizer for synthesizing an oligosiloxane by performing:

a hydrosilylation step for generating an alkoxysilane having a structure represented by the following Formula (b') by reacting a hydrosilane having a structure represented by the following Formula (a) with a carbonyl compound represented by the following Formula (E) in the presence of a boron compound having Lewis acidity; and a condensation step for generating a hydrosiloxane having a structure represented by the following Formula (d) by reacting the alkoxysilane having the structure represented by Formula (b') generated in the hydrosilylation step with a hydrosilane having a structure represented by the following Formula (c) in the presence of a boron compound having Lewis acidity, which is equipped with:

a reactor for performing the hydrosilylation reaction and the condensation reaction;

a hydrosilane container for storing the hydrosilane having the structure represented by Formula (a);

a carbonyl compound container for storing the carbonyl compound represented by Formula (E);

a hydrosilane transfer mechanism for transferring the hydrosilane having the structure represented by Formula (a) from the hydrosilane container to the reactor;

a carbonyl compound transfer mechanism for transferring the carbonyl compound represented by Formula (E) from the carbonyl compound container to the reactor; and a controller for control operation that involves operating the hydrosilane transfer mechanism to transfer the hydrosilane having the structure represented by Formula (a) from the hydrosilane container to the reactor, and operating the carbonyl compound transfer mechanism to transfer the carbonyl compound represented by Formula (E) from the carbonyl compound container to the reactor.

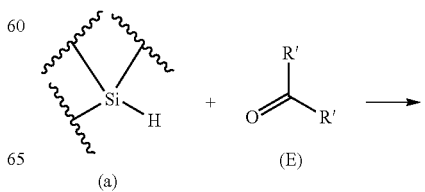

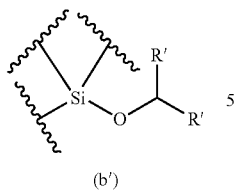

(b')

(In Formula (E) and Formula (b'), R' each independently represents a hydrogen atom or a C1-8 hydrocarbon group, where two R's in Formula (E) and two R' in Formula (b') are the same combination.)

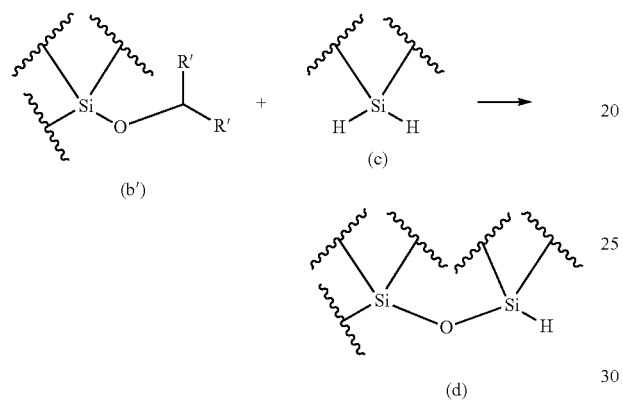

(The structure represented by Formula (b') and the structure represented by Formula (c) may be each contained in different compounds or in one molecule.)

<11> An oligosiloxane, which is represented by any one of the following Formulae (G-1) to (G-14).

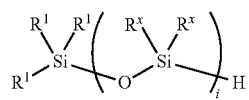 (G-1)

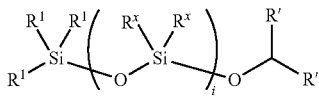 (G-2)

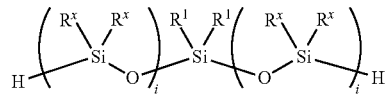 (G-3)

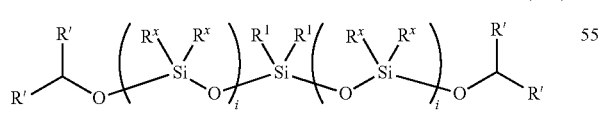 (G-4)

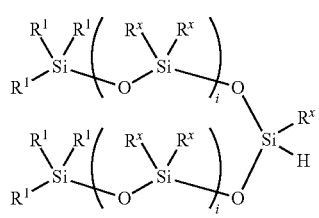 (G-5)

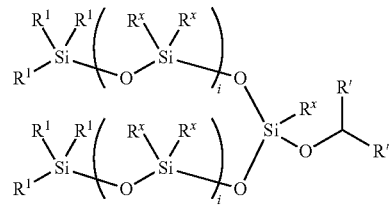 (G-6)

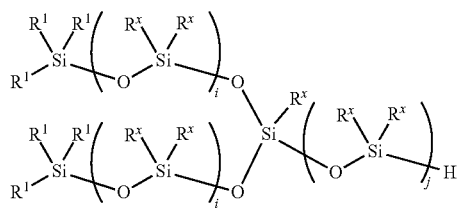 (G-7)

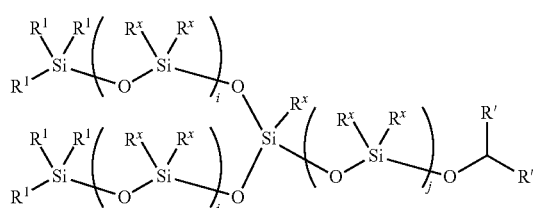 (G-8)

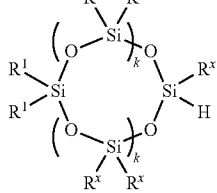 (G-9)

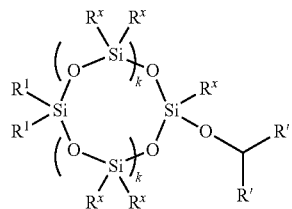 (G-10)

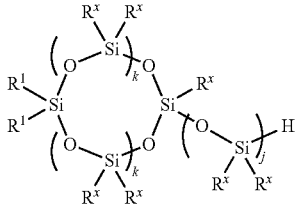 (G-11)

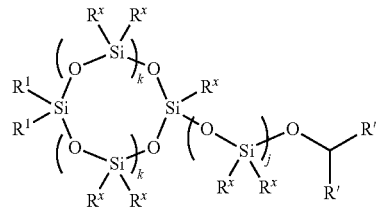 (G-12)

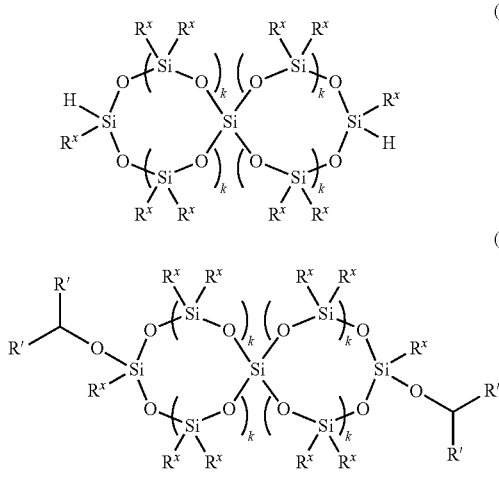

(G-13)

(G-14)

(In Formulae (G-1) to (G-14), $R^1$ each independently represents a C1-20 hydrocarbon group which may contain at least one type of atom selected from the group consisting of a nitrogen atom, an oxygen atom, a sulfur atom, and a halogen atom, R' each independently represents a hydrogen atom or a C1-8 hydrocarbon group, $R^x$ each independently represents a C1-20 hydrocarbon group which may contain at least one type of atom selected from the group consisting of a nitrogen atom, an oxygen atom, a sulfur atom, and a halogen atom, i represents an integer of 2-20, j represents an integer of 1-20, and k represents an integer of 1-20.)

Advantageous Effects of Invention

According to the present invention, an oligosiloxane can be efficiently produced. Furthermore, an oligosiloxane having arbitrary substituent sequences can be produced.

DESCRIPTION OF EMBODIMENTS

Figure 1:
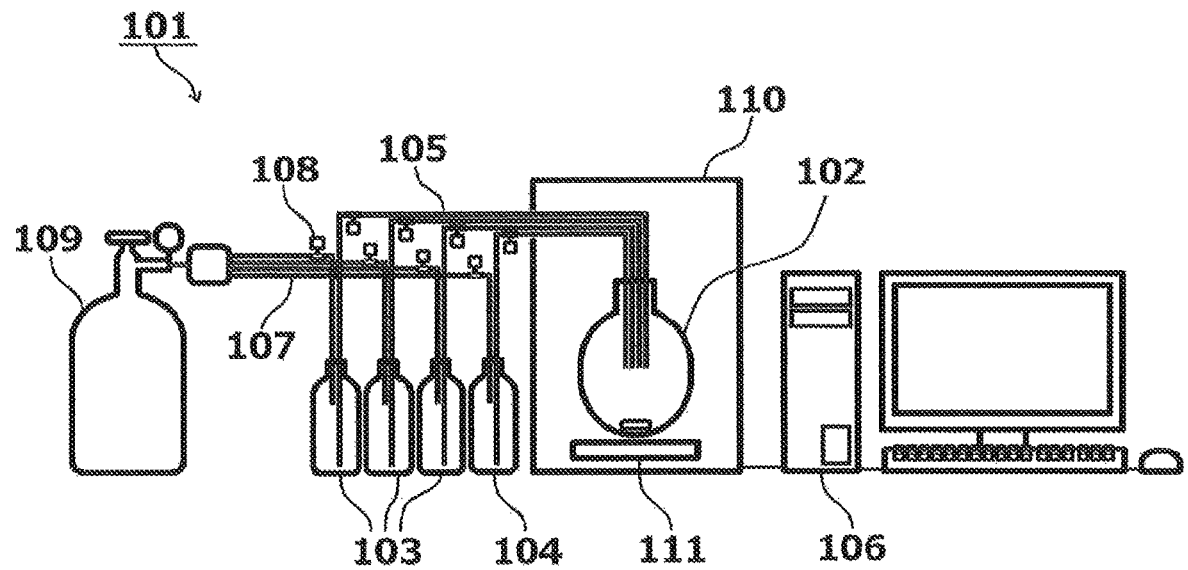
FIG. 1 is a schematic diagram depicting an embodiment of the oligosiloxane synthesizer that is an aspect of the present invention.

The present invention will be described in detail with reference to specific examples, but is not limited to the following contents and may be modified and carried out as appropriate without departing from the spirit thereof.

<Method for Producing Oligosiloxane>

A method for producing an oligosiloxane, which is an aspect of the present invention (hereinafter, it may also be abbreviated as "production method of the present invention".) includes: a condensation step for generating a hydrosiloxane having a structure represented by the following Formula (d) by reacting an alkoxysilane having a structure represented by the following Formula (b) with a hydrosilane having a structure represented by the following Formula (c) in the presence of a boron compound having Lewis acidity (hereinafter, it may also be abbreviated as "condensation step".); and a hydrosilylation step for generating an alkoxysiloxane having a structure represented by the following Formula (f) by reacting the hydrosiloxane having the structure represented by Formula (d) generated in the condensation step with a carbonyl compound represented by the following formula (E) in the presence of a boron compound having Lewis acidity (hereinafter, it may also be abbreviated as "hydrosilylation step".).

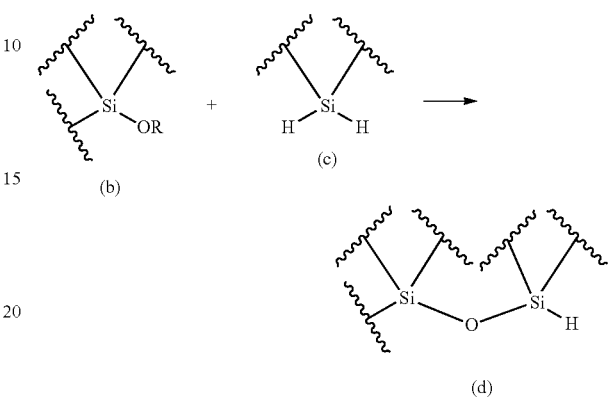

(In Formula (b), R represents a C1-20 hydrocarbon group or a group represented by —$CHR'_2$, and R' each independently represents a hydrogen atom or a C1-8 hydrocarbon group. The structure represented by Formula (b) and the structure represented by Formula (c) may be each contained in different compounds or in one molecule.)

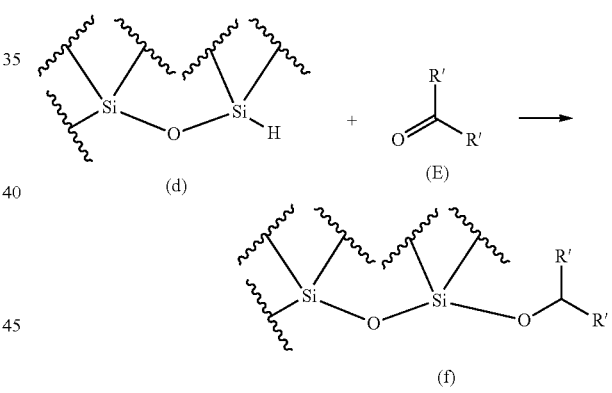

(In Formula (E) and Formula (f), R' each independently represents a hydrogen atom or a C1-8 hydrocarbon group, where two R's in Formula (E) and two R's in Formula (f) are the same combination.)

Furthermore, another aspect of the present invention includes: a hydrosilylation step for generating an alkoxysilane having a structure represented by the following Formula (b') by reacting a hydrosilane having a structure represented by the following Formula (a) with a carbonyl compound represented by the following Formula (E) in the presence of a boron compound having Lewis acidity; and a condensation step for generating a hydrosiloxane having a structure represented by the following Formula (d) by reacting the alkoxysilane having the structure represented by Formula (b') generated in the hydrosilylation step with a hydrosilane having a structure represented by the following Formula (c) in the presence of a boron compound having Lewis acidity.

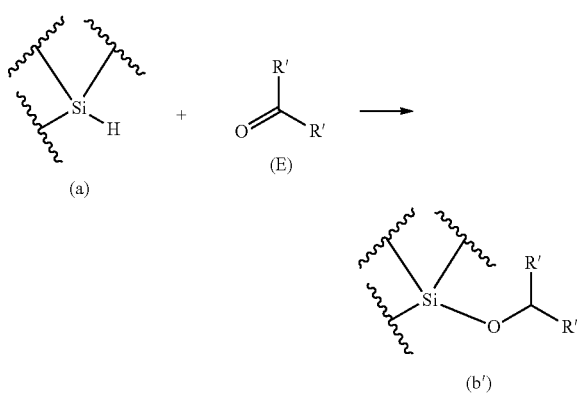

(In Formula (E) and Formula (b'), R' each independently represents a hydrogen atom or a C1-8 hydrocarbon group, where two R's in Formula (E) and two R' in Formula (b') are the same combination.)

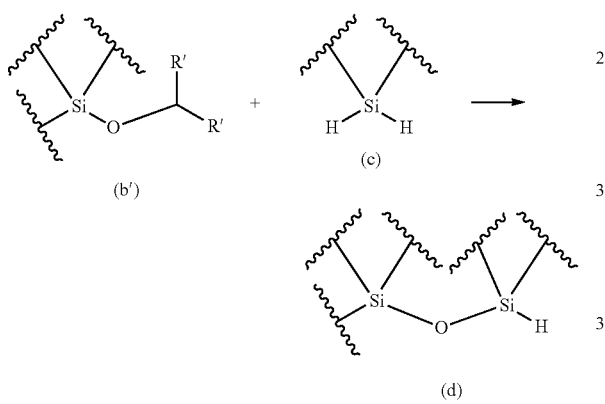

(The structure represented by Formula (b') and the structure represented by Formula (c) may be each contained in different compounds or in one molecule.)

Methods for forming siloxane bonds involving hydrolysis/condensation of alkoxysilane or chlorosilane, are impossible in principle to precisely control the substituent sequences of a siloxane to be generated. Furthermore, catalytic methods for forming siloxane bonds have also been developed in recent years, however, no technology for controlling the sequences of siloxane bonds of oligosiloxanes through sequential and repeated siloxane bond formation has been currently reported.

The present inventors have discovered that: through combination of a condensation reaction of an alkoxysilane and a dihydrosilane using a boron compound having Lewis acidity as a catalyst with a hydrosilylation reaction of a hydrosiloxane and a carbonyl compound using a boron compound having Lewis acidity as a catalyst, an oligosiloxane can be efficiently produced; and the substituent sequences of an oligosiloxane can be precisely controlled by repeating the condensation reaction and the hydrosilylation reaction alternately. An aspect of the present invention is characterized by performing both "condensation step" and "hydrosilylation step" in sequence. The "condensation step" may be performed first or the "hydrosilylation step" may be performed first according to the starting materials. It is noted that wavy lines in Formulae (a), (b), (b'), (c), (d), and (f) mean that structures corresponding to these parts may be arbitrary structures.

Furthermore, the "condensation step" is not limited by that the alkoxysilane having the structure represented by Formula (b) or (b') and the hydrosilane having the structure represented by Formula (c) react with each other at 1:1 (in terms of the amount of substance). The "hydrosilylation step" is not limited by that the hydrosiloxane having the structure represented by Formula (d) or (a) and the carbonyl compound represented by Formula (E) react with each other at 1:1 (in terms of the amount of substance). For example, when the alkoxysilane having the structure represented by Formula (b) has 2 or more alkoxy groups (—OR), the "condensation step" and the "hydrosilylation step" can proceed as the progression of the reaction represented by the following Formula.

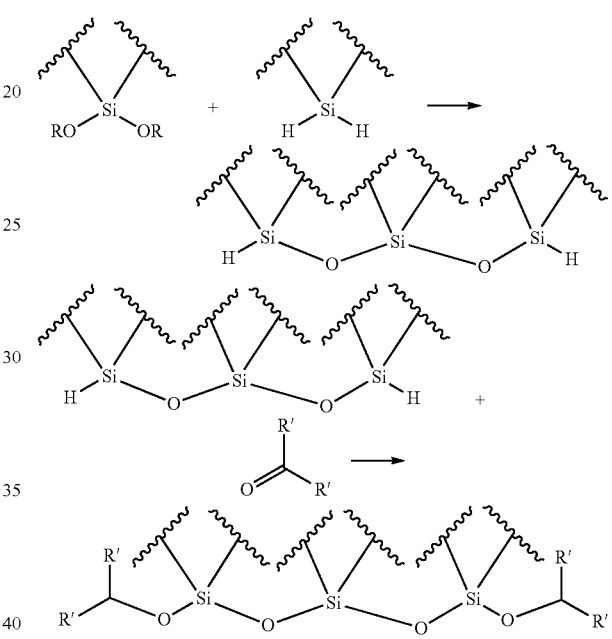

Furthermore, the term "oligosiloxane(s)" refers to a compound(s) having —(SiO)$_m$— (m=2 to 20) bonds such as disiloxane, trisiloxane, and tetrasiloxane. Such an oligosiloxane may have a branched structure or a cyclic structure.

Hereinafter, the "condensation step" and the "hydrosilylation step", etc., will be described more specifically using a case, in which at least the "condensation step" is performed first and then the "hydrosilylation step" is performed, as an example.

(Condensation Step)

The condensation step is a step for generating a hydrosiloxane having a structure represented by Formula (d) by reacting an alkoxysilane having a structure represented by Formula (b) with a hydrosilane having a structure represented by Formula (c) in the presence of a boron compound having Lewis acidity. Specific types of the alkoxysilane having the structure represented by Formula (b) are not particularly limited and should be selected appropriately according to an oligosiloxane that is an object of production. It is noted that when at least the "hydrosilylation step" is performed first and then the "condensation step" is performed, "alkoxysilane having the structure represented by Formula (b)" should be read as "alkoxysilane having the structure represented by Formula (b')".

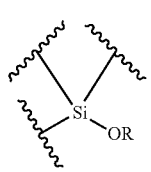

(b)

R in Formula (b) represents a "C1-20 hydrocarbon group (having 1 to 20 carbon atoms)" or a "group represented by —CHR'$_2$", R' each independently represents a "hydrogen atom" or a "C1-8 hydrocarbon group", wherein the "hydrocarbon group" may have each of a branched structure and a cyclic structure, and may be any of a saturated hydrocarbon group, an unsaturated hydrocarbon group, an aromatic hydrocarbon group, and the like.

The number of carbon atoms when R is a hydrocarbon group is preferably 12 or less, more preferably 10 or less, and further preferably 8 or less. The number of carbon atoms when R is an aromatic hydrocarbon group is generally 6 or more.

Examples of R include a methyl group (—CH$_3$, —Me), an ethyl group (—C$_2$H$_5$, -Et), an n-propyl group (—$^n$C$_3$H$_7$, —$^n$Pr), an i-propyl group (—$^i$C$_3$H$_7$, —$^i$Pr), an n-butyl group (—$^n$C$_4$H$_9$, —$^n$Bu), a t-butyl group (—$^t$C$_4$H$_9$, —$^t$Bu), an n-pentyl group (—$^n$C$_5$H$_{11}$), an n-hexyl group (—$^n$C$_6$H$_{13}$, —$^n$Hex), a cyclohexyl group (—$^c$C$_6$H$_{11}$, —Cy), an allyl group (—CH$_2$CH=CH$_2$), a phenylmethyl group (—CH$_2$C$_6$H$_5$), a vinyl group (—CH=CH$_2$), and a phenyl group (—C$_6$H$_5$, -Ph).

The number of carbon atoms when R' is a hydrocarbon group is preferably 7 or less, more preferably 6 or less, and further preferably 4 or less. The number of carbon atoms when R' is an aromatic hydrocarbon group is generally 6 or more.

Examples of R' include a hydrogen atom, a methyl group (—CH$_3$, —Me), an ethyl group (—C$_2$H$_5$, -Et), an n-propyl group (—$^n$C$_3$H$_7$, —$^n$Pr), an i-propyl group (—$^i$C$_3$H$_7$, —$^i$Pr), an n-butyl group (—$^n$C$_4$H$_9$, —$^n$Bu), a t-butyl group ($^t$C$_4$H$_9$, —$^t$Bu), an n-pentyl group (—$^n$C$_5$H$_{11}$), an n-hexyl group (—$^n$C$_6$H$_{13}$, —$^n$Hex), a cyclohexyl group (—$^c$C$_6$H$_{11}$, —Cy), an allyl group (—CH$_2$CH=CH$_2$), a phenylmethyl group (—CH$_2$C$_6$H$_5$), a vinyl group (—CH=CH$_2$), and a phenyl group (—C$_6$H$_5$, -Ph).

Examples of a group represented by —O—CHR'$_2$ include groups represented by the following Formulae.

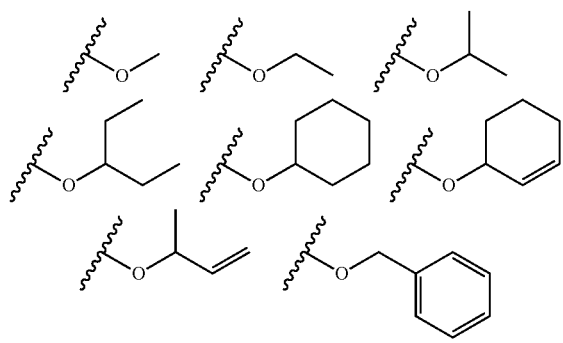

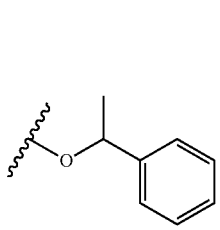 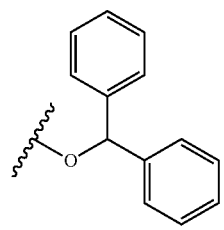

When R is a group represented by —CHR'$_2$, specifically, when the alkoxysilane having the structure represented by Formula (b) is an alkoxysilane having a structure represented by the following Formula (b'), the alkoxysilane having the structure represented by Formula (b') may be generated by reacting a hydrosilane having a structure represented by the following Formula (a) with a carbonyl compound represented by the following Formula (E) in the presence of a boron compound having Lewis acidity.

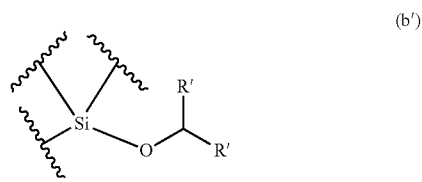

(b')

(In Formula (b'), R' each independently represents a hydrogen atom or a C1-8 hydrocarbon group.)

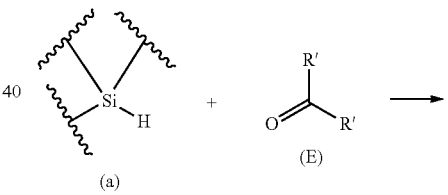

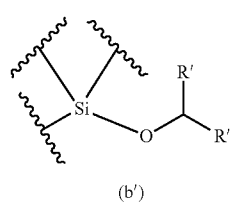

(b')

(In Formula (E) and Formula (b'), R' each independently represents a hydrogen atom or a C1-8 hydrocarbon group, where two R's in Formula (E) and two R' in Formula (b') are the same combination.)

Examples of the alkoxysilane having the structure represented by Formula (b) include an alkoxymonosilane and an alkoxyoligosiloxane having 2-20 silicon atoms. Hereinafter, the "alkoxymonosilane" and the "alkoxyoligosiloxane having 2-20 silicon atoms" will be described in detail as follows.

Examples of the alkoxymonosilane include alkoxysilanes represented by any one of the following Formulae (B-1) to (B-4).

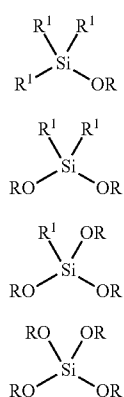

(In Formulae (B-1) to (B-4), 10 each independently represents a C1-20 hydrocarbon group which may contain at least one type of atom selected from the group consisting of a nitrogen atom, an oxygen atom, a sulfur atom, and a halogen atom, R represents a C1-20 hydrocarbon group, or a group represented by —CHR'$_2$, and R' each independently represents a hydrogen atom or a C1-8 hydrocarbon group.)

$R^1$ in Formulae (B-1) to (B-4) each independently represents "a C1-20 hydrocarbon group which may contain at least one type of atom selected from the group consisting of a nitrogen atom, an oxygen atom, a sulfur atom, and a halogen atom". The expression "which may contain at least one type of atom selected from the group consisting of a nitrogen atom, an oxygen atom, a sulfur atom, and a halogen atom" means that hydrogen atoms of the hydrocarbon group may be substituted with monovalent functional groups including a nitrogen atom, an oxygen atom, a sulfur atom, a halogen atom, and the like, as well as carbon atoms within the carbon skeleton of the hydrocarbon group may be substituted with divalent or greater functional groups (linking groups) including a nitrogen atom, an oxygen atom, a sulfur atom and the like. Furthermore, the term "hydrocarbon group" may have each of a branched structure and a cyclic structure, and may be any of a saturated hydrocarbon group, an unsaturated hydrocarbon group, an aromatic hydrocarbon group, and the like.

The number of carbon atoms of $R^1$ that is a hydrocarbon group is preferably 12 or less, more preferably 10 or less, and further preferably 8 or less. When $R^1$ is an aromatic hydrocarbon group, the number of carbon atoms is generally 6 or more.

Examples of functional groups contained in $R^1$ that is a hydrocarbon group include an ether group ("oxa" group, —O—), a thioether group (a thia group, —S—), a fluoro group (—F), a chloro group (—Cl), a bromo group (—Br), an iodo group (—I), an alkenyl group, and an alkynyl group. When the functional groups contain carbon atoms, such as an alkenyl group and an alkynyl group, the number of the carbon atoms is also included in the number of carbon atoms of the hydrocarbon group.

Hence, examples of the C1-20 hydrocarbon group "which may contain at least one type of atom selected from the group consisting of a nitrogen atom, an oxygen atom, a sulfur atom, and a halogen atom" include a C2 hydrocarbon group containing halogen, such as —CH$_2$—CH$_2$—Br, a C2 hydrocarbon group containing an ether group within the carbon skeleton, such as —CH$_2$—O—CH$_3$, and a C4 hydrocarbon group containing a thia group within the carbon skeleton, such as —CH$_2$—CH$_2$—S—CH$_2$—CH$_3$.

Specific examples of $R^1$ include a methyl group (—CH$_3$, —Me), an ethyl group (—C$_2$H$_5$, -Et), an n-propyl group (—$^n$C$_3$H$_7$, —$^n$Pr), an i-propyl group (—$^i$C$_3$H$_7$, —$^i$Pr), an n-butyl group (—$^n$C$_4$H$_9$, —$^n$Bu), a t-butyl group (—$^t$C$_4$H$_9$, —$^t$Bu), an n-pentyl group (—$^n$C$_5$H$_{11}$), an n-hexyl group (—$^n$C$_6$H$_{13}$, —$^n$Hex), a cyclohexyl group (—$^c$C$_6$H$_{11}$, —Cy), and a phenyl group (—C$_6$H$_5$, -Ph).

Examples of an alkoxysilane represented by any one of Formulae (B-1) to (B-4) include those represented by the following Formulae.

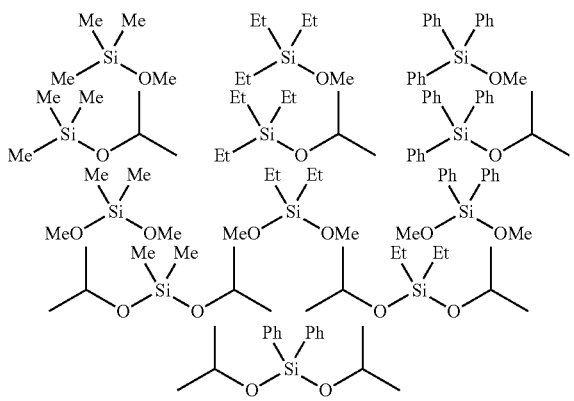

The term "alkoxyoligosiloxane having 2-20 silicon atoms" refers to an oligosiloxane having an alkoxy group(s) (—OR) and may have each of a branched structure and a cyclic structure.

The number of silicon atoms of the alkoxyoligosiloxane having 2-20 silicon atoms is preferably 16 or less, more preferably 12 or less, and further preferably 8 or less.

The number of alkoxy groups (—OR) of the alkoxyoligosiloxane having 2-20 silicon atoms is generally 1 or more, generally 4 or less, preferably 3 or less, and more preferably 2 or less.

Examples of a substituent contained in the alkoxyoligosiloxane having 2-20 silicon atoms include a C1-20 hydrocarbon group which may contain at least one type of atom selected from the group consisting of a nitrogen atom, an oxygen atom, a sulfur atom, and a halogen atom. It is noted that the expression "a C1-20 hydrocarbon group which may contain at least one type of atom selected from the group consisting of a nitrogen atom, an oxygen atom, a sulfur atom, and a halogen atom" is synonymous with that of $R^1$.

Examples of the alkoxyoligosiloxane having 2-20 silicon atoms include an alkoxyoligosiloxane represented by any one of the following Formulae (B-5) and (B-6).

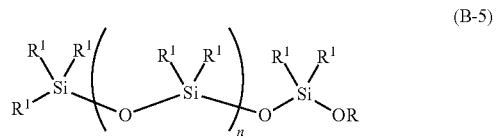

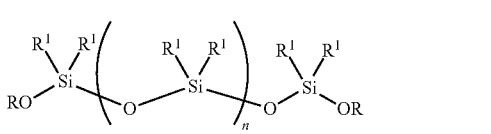

(In Formulae (B-5) and (B-6), R¹ each independently represents a C1-20 hydrocarbon group which may contain at least one type of atom selected from the group consisting of a nitrogen atom, an oxygen atom, a sulfur atom, and a halogen atom, R represents a C1-20 hydrocarbon group or a group represented by —CHR'₂, R' each independently represents a hydrogen atom or a C1-8 hydrocarbon group, and n represents an integer of 0 to 18.)

In addition, examples of R¹ in Formulae (B-5) and (B-6) include those similar to R¹ in Formulae (B-1) to (B-4).

Examples of an alkoxyoligosiloxane represented by any one of Formulae (B-5) and (B-6) include those represented by the following Formulae.

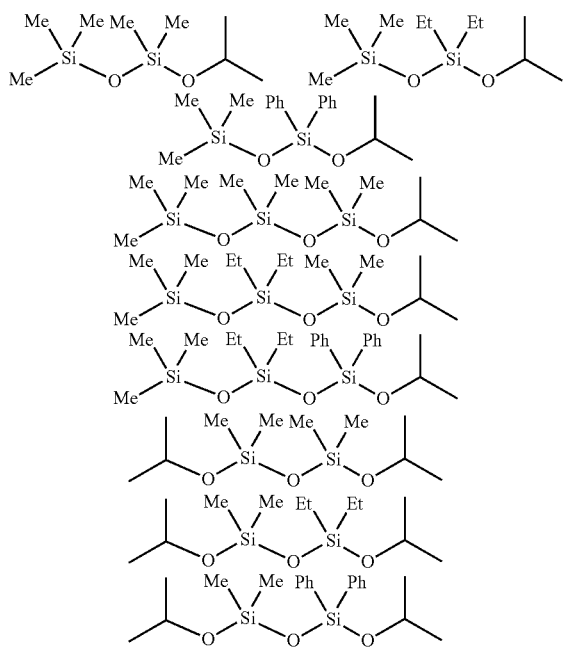

Specific types of the hydrosilane having the structure represented by Formula (c) are not particularly limited and should be selected as appropriate according to an oligosiloxane that is an object of production.

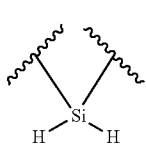

(c)

Examples of the hydrosilane having the structure represented by Formula (c) include a hydrosilane represented by any one of the following Formulae (C-1) to (C-3).

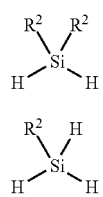

(C-1)

(C-2)

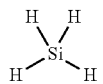

(C-3)

(In Formulae (C-1) and (C-2), R² each independently represents a C1-20 hydrocarbon group which may contain at least one type of atom selected from the group consisting of a nitrogen atom, an oxygen atom, a sulfur atom, and a halogen atom.)

R² in Formulae (C-1) and (C-2) each independently represents "a C1-20 hydrocarbon group which may contain at least one type of atom selected from the group consisting of a nitrogen atom, an oxygen atom, a sulfur atom, and a halogen atom", and the expression "hydrocarbon group which may contain at least one type of atom selected from the group consisting of a nitrogen atom, an oxygen atom, a sulfur atom, and a halogen atom" is synonymous with that of R¹.

The number of carbon atoms of R² that is a hydrocarbon group is preferably 12 or less, more preferably 10 or less, and further preferably 8 or less, and the number of carbon atoms when R¹ is an aromatic hydrocarbon group is generally 6 or more.

Examples of a functional group contained in R² that is a hydrocarbon group include an ether group (oxa group, —O—), a thioether group (thia group, —S—), a fluoro group (—F), a chloro group (—Cl), a bromo group (—Br), an iodo group (—I), an alkenyl group, and an alkynyl group.

Examples of R² include a methyl group (—CH₃, —Me), an ethyl group (—C₂H₅, -Et), an n-propyl group (—ⁿC₃H₇, —ⁿPr), an i-propyl group (—ⁱC₃H₇, —ⁱPr), an n-butyl group (—ⁿC₄H₉, —ⁿBu), a t-butyl group (—ᵗC₄H₉, —ᵗBu), an n-pentyl group (—ⁿC₅H₁₁), an n-hexyl group (—ⁿC₆H₁₃, —ⁿHex), a cyclohexyl group (—ᶜC₆H₁₁, —Cy), and a phenyl group (—C₆H₅, -Ph).

Examples of a hydrosilane represented by any one of Formulae (C-1) and (C-2) include hydrosilanes represented by the following Formulae.

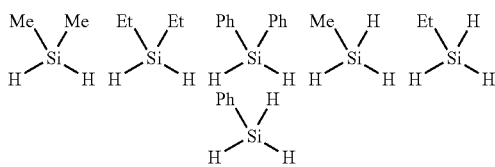

The amount of the hydrosilane having the structure represented by Formula (c) to be used (the amount of the hydrosilane charged) in the condensation step, is generally 0.5 or more equivalent, preferably 0.9 or more equivalent, and more preferably 0.95 or more equivalent, and is generally 1.5 or less equivalents, preferably 1.1 or less equivalents, and more preferably 1.05 or less equivalents to the amount of substance of an alkoxy group (—OR) of the alkoxysilane having the structure represented by Formula (b). With the amount of the hydrosilane within the above range, oligosiloxanes can be produced more efficiently.

Specific types of a boron compound having Lewis acidity in the condensation step are not particularly limited and can be selected as appropriate according to the purpose. The type of the boron compound having Lewis acidity is not limited to one type and two or more types thereof can be used in combination.

Examples of the boron compound having Lewis acidity include tris(pentafluorophenyl)borane ($B(C_6F_5)_3$), tris(pentachlorophenyl)borane ($B(C_6Cl_5)_3$) and triphenylborane ($BPh_3$). Tris(pentafluorophenyl)borane is particularly preferable. With the above examples of the boron compound, oligosiloxanes can be produced more efficiently.

The amount of the boron compound having Lewis acidity to be used (the amount of the boron compound to be charged) in the condensation step is generally 0.01 mol % or more, preferably 0.1 mol % or more, and more preferably 1 mol % or more, and is generally 20 mol % or less, preferably 10 mol % or less, and more preferably 5 mol % or less in terms of the amount of substance with respect to the alkoxysilane having the structure represented by Formula (b). With the amount of the boron compound within the above range, oligosiloxanes can be produced more efficiently.

In the condensation step, a solvent is preferably used. The type of a solvent is not particularly limited and can be selected as appropriate according to the purpose. Specific examples of a solvent include: hydrocarbon solvents such as hexane, benzene, and toluene; and halogen solvents such as methylene chloride, and chloroform. Of these, toluene is particularly preferable.

With such a solvent, oligosiloxanes can be produced more efficiently.

The reaction temperature for the condensation step is generally 0° C. or higher, preferably 10° C. or higher, and more preferably 20° C. or higher, and is generally 80° C. or lower, preferably 60° C. or lower, and more preferably 40° C. or lower.

The reaction time for the condensation step is generally 1 or more minutes, preferably 5 or more minutes, and more preferably 10 or more minutes, and is generally 12 or less hours, preferably 6 or less hours, and more preferably 1 or less hour.

The condensation step is preferably performed under an inert gas atmosphere such as a nitrogen gas atmosphere and an argon gas atmosphere.

With the above conditions met, oligosiloxanes can be produced more efficiently.

(Hydrosilylation Step)

The hydrosilylation step is a step for generating an alkoxysiloxane having a structure represented by Formula (f) by reacting the hydrosiloxane having the structure represented by Formula (d) generated in the condensation step with a carbonyl compound represented by Formula (E) in the presence of a boron compound having Lewis acidity. Specific types of the carbonyl compound represented by Formula (E) are not particularly limited and can be selected as appropriate according to the purpose. It is noted that when at least the "hydrosilylation step" is performed first and then the "condensation step" is performed, "alkoxysilane having the structure represented by Formula (d)" should be read as "alkoxysilane having the structure represented by Formula (a)"

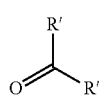
(E)

R' in Formula (E) represents each independently a "hydrogen atom" or a "C1-8 hydrocarbon group" but the term "hydrocarbon group" is synonymous with that of R.

The number of carbon atoms when R' is a hydrocarbon group is preferably 7 or less and more preferably 6 or less, and the number of carbon atoms when R' is an aromatic hydrocarbon group is generally 6 or more.

Examples of R' include a hydrogen atom, a methyl group ($—CH_3$, —Me), an ethyl group ($—C_2H_5$, -Et), an n-propyl group ($—^nC_3H_7$, $—^nPr$), an i-propyl group ($—^iC_3H_7$, $—^iPr$), an n-butyl group ($—^nC_4H_9$, $—^nBu$), a t-butyl group ($—^tC_4H_9$, $—^tBu$), an n-pentyl group ($—^nC_5H_{11}$), an n-hexyl group ($—^nC_6H_{13}$, $—^nHex$), a cyclohexyl group ($—^cC_6H_{11}$, —Cy), an allyl group ($—CH_2CH=CH_2$), a phenylmethyl group ($—CH_2C_6H_5$), a vinyl group ($—CH=CH_2$), and a phenyl group ($—C_6H_5$, -Ph).

Examples of the carbonyl compound represented by Formula (E) include formaldehyde, acetaldehyde, benzaldehyde, acetone, 3-pentanone, acetophenone, and benzophenone represented by the following Formulae.

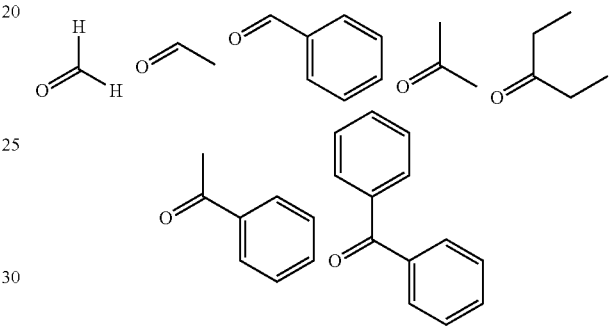

The amount of the carbonyl compound represented by Formula (E) to be used (the amount of the carbonyl compound to be charged) in the hydrosilylation step is generally 0.5 or more equivalent, preferably 0.9 or more equivalent, and more preferably 0.95 or more equivalent, and is generally 1.5 or less equivalents, preferably 1.1 or less equivalents, and more preferably 1.05 or less equivalents to the amount of substance of a hydrogen atom (Si—H) of the hydrosiloxane having the structure represented by Formula (d). With the amount of the carbonyl compound within the above range, oligosiloxanes can be produced more efficiently.

Specific types of a boron compound having Lewis acidity in the hydrosilylation step are not particularly limited and can be selected as appropriate according to the purpose. The type of the boron compound having Lewis acidity is not limited to one type and two or more types thereof may be used in combination.

Examples of a boron compound having Lewis acidity include tris(pentafluorophenyl)borane ($B(C_6F_5)_3$), tris(pentachlorophenyl)borane ($B(C_6Cl_5)_3$), and triphenylborane ($BPh_3$). Tris(pentafluorophenyl)borane is particularly preferable. With such a boron compound, oligosiloxanes can be produced more efficiently.

It is noted that a boron compound having Lewis acidity to be used in the hydrosilylation step may be the one used in the condensation step. The boron compound having Lewis acidity used in the condensation step is used directly, so that purification etc., following the condensation step can be omitted and oligosiloxanes can be produced more efficiently. Particularly, the condensation step and the hydrosilylation step are performed in one reactor, so that the condensation step and the hydrosilylation step can be performed continuously and oligosiloxanes can be produced extremely efficiently. Similarly, when at least the "hydrosilylation step" is performed first and then the "condensation step" is performed, the boron compound having Lewis acidity used in the hydrosilylation step may be used in the condensation step.

The amount of a boron compound having Lewis acidity to be used (amount of the boron compound to be charged) in the hydrosilylation step is generally 0.01 mol % or more, preferably 0.1 mol % or more, and more preferably 1 mol % or more, and is generally 20 mol % or less, preferably 10 mol % or less, and more preferably 5 mol % or less in terms of the amount of substance with respect to the hydrosiloxane having the structure represented by Formula (d). With the amount within the above range, oligosiloxanes can be produced more efficiently.

In the hydrosilylation step, a solvent is preferably used. The type of a solvent is not particularly limited and can be selected as appropriate according to the purpose. Specific examples of a solvent include: hydrocarbon solvents such as hexane, benzene, and toluene; and halogen solvents such as methylene chloride and chloroform. Of these, toluene is particularly preferable.

With the above solvents, oligosiloxanes can be produced more efficiently.

It is noted that a solvent to be used in the hydrosilylation step may be one used in the condensation step. The boron compound having Lewis acidity and the solvent used in the condensation step are used directly, so that purification etc., following the condensation step can be omitted and oligosiloxanes can be produced more efficiently. Particularly, the condensation step and the hydrosilylation step are performed in one reactor, so that the condensation step and the hydrosilylation step can be performed continuously and oligosiloxanes can be produced extremely efficiently.

The reaction temperature for the hydrosilylation step is generally 0° C. or higher, preferably 10° C. or higher, and more preferably 20° C. or higher, and is generally 80° C. or lower, preferably 60° C. or lower, and more preferably 40° C. or lower.

The reaction time for the hydrosilylation step is generally 1 or more minutes, preferably 5 or more minutes, and more preferably 10 or more minutes, and is generally 12 or less hours, preferably 6 or less hours, and more preferably 1 or less hour.

The hydrosilylation step is preferably performed under an inert gas atmosphere such as a nitrogen gas atmosphere and an argon gas atmosphere.

With the reaction temperature and the reaction time within the above ranges, oligosiloxanes can be produced more efficiently.

The production method of the present invention is characterized by including the condensation step and the hydrosilylation step. An example of a preferred aspect of the production method of the present invention is an aspect including two or more condensation steps and two or more hydrosilylation steps, wherein the condensation step and the hydrosilylation step are performed alternately. It is noted that the expression " . . . includes two or more condensation steps and two or more hydrosilylation steps, wherein the condensation step and the hydrosilylation step are performed alternately" means that a condensation step and a hydrosilylation step are alternately performed repeatedly as in the order of the $1^{st}$ condensation step, the $1^{st}$ hydrosilylation step, the $2^{nd}$ condensation step, the $2^{nd}$ hydrosilylation step, the $3^{rd}$ condensation step, the $3^{rd}$ hydrosilylation step . . . . The alkoxysiloxane having the structure represented by Formula (f) generated in a hydrosilylation step has "group represented by —CHR'$_2$", and thus can be the alkoxysilane having the structure represented by Formula (b) in a new condensation step, as represented by the following Formula. In this manner, the condensation step and the hydrosilylation step can be alternately performed repeatedly.

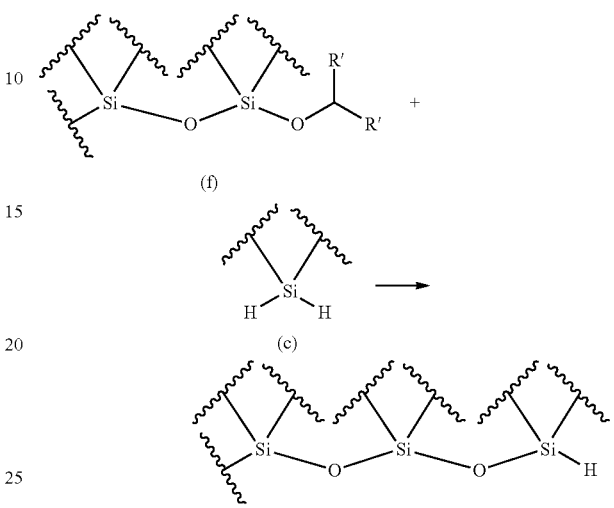

The condensation step plays a role in introducing a new siloxane structure according to the hydrosilane having the structure represented by Formula (c), and the hydrosilylation step plays a role in regenerating an alkoxy group. These steps are alternately performed repeatedly, so that the siloxane structure is elongated. In such an aspect, desired siloxane structures are introduced one by one into an oligosiloxane, so that the substituent sequences of the thus-obtained oligosiloxane can be precisely controlled.

The numbers of the condensation steps and the hydrosilylation steps are each generally 20 or less, preferably 12 or less, and more preferably 8 or less. The series of the steps can be started from either the condensation step or the hydrosilylation step, and reaction may be completed in either the condensation step or the hydrosilylation step.

As a preferred aspect of the production method of the present invention, an aspect including two or more condensation steps and two or more hydrosilylation steps is as described above, wherein the condensation step and the hydrosilylation step are alternately performed repeatedly. With the use of such an aspect, the siloxane structure of an oligosiloxane can be elongated as described in the following (i) to (iv).

(i) Unidirectional Type

A siloxane structure is elongated into a single direction, so as to generate a single-stranded oligosiloxane (see the following Formula.).

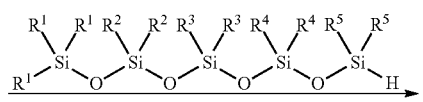

(ii) Bidirectional Type

A siloxane structure is elongated into two directions, so as to generate a single-stranded oligosiloxane (see the following Formula.).

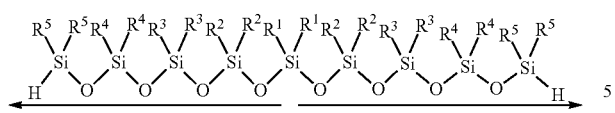

(iii) Convergence Type

Elongated siloxane structures converge to generate a single-stranded oligosiloxane.

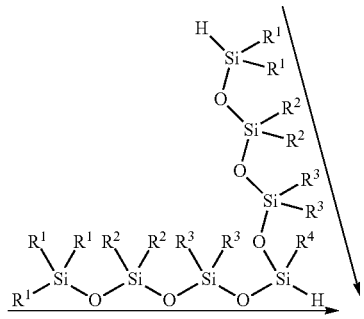

(iv) Convergence—Unidirectional Type

From a siloxane structure resulting from convergence, a siloxane structure is further elongated into a single direction, so as to generate a branched oligosiloxane.

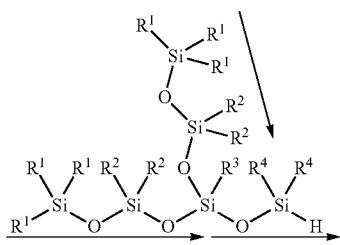

(v) Cyclized Type

Difunctional or greater polyfunctional siloxane compounds converge to generate a cyclic oligosiloxane. Furthermore, from the cyclized siloxane structure, a siloxane structure can further be elongated. Moreover, tetrafunctional siloxane compounds can converge to generate a spirosiloxane.

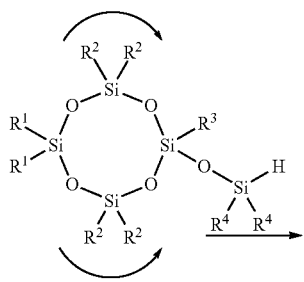

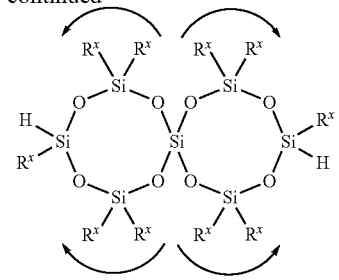

<Oligosiloxane Synthesizer>

An oligosiloxane can be efficiently produced by the production method of the present invention as described above. The following oligosiloxane synthesizer (hereinafter, sometimes abbreviated as "the synthesizer of the present invention") with which the production method of the present invention can be performed is also an aspect of the present invention.

This aspect is an oligosiloxane synthesizer for synthesizing an oligosiloxane by performing:

a condensation reaction (hereinafter, sometimes abbreviated as "condensation reaction") for generating a hydrosiloxane having a structure represented by Formula (d) by reacting an alkoxysilane having a structure represented by Formula (b) (hereinafter, sometimes abbreviated as "alkoxysilane") with a hydrosilane having a structure represented by Formula (c) (hereinafter, sometimes abbreviated as "hydrosilane") in the presence of a boron compound having Lewis acidity (hereinafter, sometimes abbreviated as "boron compound"); and a hydrosilylation reaction (hereinafter, sometimes abbreviated as "hydrosilylation reaction") for generating an alkoxysiloxane having a structure represented by Formula (f) by reacting the hydrosiloxane having the structure represented by Formula (d) generated in the condensation reaction with a carbonyl compound represented by Formula (E) (hereinafter, sometimes abbreviated as "carbonyl compound") in the presence of a boron compound having Lewis acidity, which is equipped with:

a reactor for performing the condensation reaction and the hydrosilylation reaction (hereinafter, sometimes abbreviated as "reactor");

a hydrosilane container for storing the hydrosilane (hereinafter, sometimes abbreviated as "hydrosilane container");

a carbonyl compound container for storing the carbonyl compound (hereinafter, sometimes abbreviated as "carbonyl compound container");

a hydrosilane transfer mechanism for transferring the hydrosilane from the hydrosilane container to the reactor (hereinafter, sometimes abbreviated as "hydrosilane transfer mechanism");

a carbonyl compound transfer mechanism for transferring the carbonyl compound from the carbonyl compound container to the reactor (hereinafter, sometimes abbreviated as "carbonyl compound transfer mechanism"); and a controller for control operation that involves operating the hydrosilane transfer mechanism to transfer the hydrosilane from the hydrosilane container to the reactor, and operating the carbonyl compound transfer mechanism to transfer the carbonyl compound from the carbonyl compound container to the reactor (hereinafter, sometimes abbreviated as "controller").

Furthermore, an oligosiloxane synthesizer for synthesizing an oligosiloxane by performing:

a hydrosilylation step for generating an alkoxysilane having a structure represented by Formula (b') by reacting a hydrosilane having a structure represented by Formula (a) with a carbonyl compound represented by Formula (E) in the presence of a boron compound having Lewis acidity; and a condensation step for generating a hydrosiloxane having a structure represented by Formula (d) by reacting the alkoxysilane having the structure represented by Formula (b') generated in the hydrosilylation step with a hydrosilane having a structure represented by Formula (c) in the presence of a boron compound having Lewis acidity, which is equipped with:

a reactor for performing the hydrosilylation reaction and the condensation reaction;

a hydrosilane container for storing the hydrosilane;

a carbonyl compound container for storing the carbonyl compound;

a hydrosilane transfer mechanism for transferring the hydrosilane from the hydrosilane container to the reactor;

a carbonyl compound transfer mechanism for transferring the carbonyl compound from the carbonyl compound container to the reactor; and a controller for control operation that involves operating the hydrosilane transfer mechanism to transfer the hydrosilane from the hydrosilane container to the reactor, and operating the carbonyl compound transfer mechanism to transfer the carbonyl compound from the carbonyl compound container to the reactor, is also another aspect of the present invention.

First Embodiment of Oligosiloxane Synthesizer

An example of the synthesizer of the present invention is an oligosiloxane synthesizer having the configuration depicted in FIG. 1.

The oligosiloxane synthesizer 101 in FIG. 1 is equipped with a reactor 102 for performing a condensation reaction and a hydrosilylation reaction, a plurality of hydrosilane containers 103 for storing a hydrosilane, a carbonyl compound container 104 for storing a carbonyl compound, a liquid feed pipe 105 for transferring the hydrosilane from the hydrosilane containers 103 to the reactor 102, and the carbonyl compound from the carbonyl compound container 104 to the reactor 102, and a controller 106 for controlling the entire oligosiloxane synthesizer 101. Furthermore, the hydrosilane containers 103 and the carbonyl compound container 104 are connected to a gas cylinder 109 via air feed pipes 107 to each of which an electromagnetic valve 108 is mounted, so that the hydrosilane and the carbonyl compound can be separately transferred to the reactor 102 using the pressure of a gas fed from the gas cylinder 109. The electromagnetic valves 108 are designed so that the controller 106 can control the opening/closing of each of these valves. Specifically, the oligosiloxane synthesizer 101 is equipped with the hydrosilane transfer mechanism and the carbonyl compound transfer mechanism, and the controller 106 can control the transfer of the hydrosilane and the transfer of the carbonyl compound.

The oligosiloxane synthesizer 101 is capable of producing an oligosiloxane by performing the following operations (1) to (4):

(1) introducing an alkoxysilane, a boron compound, and a solvent into the reactor 102;

(2) transferring a hydrosilane from the hydrosilane containers 103 to the reactor 102, so as to initiate a condensation reaction;

(3) transferring a carbonyl compound from the carbonyl compound container 104 to the reactor 102, so as to initiate a hydrosilylation reaction; and (4) repeating operation (2) and operation (3) according to an oligosiloxane to be produced.

Operation (2) and operation (3) can be automatically performed using the controller 106, and thus the oligosiloxane synthesizer 101 is capable of efficiently producing an oligosiloxane having arbitrary substituent sequences.

Hereinafter, the terms "reactor", "hydrosilane container", "carbonyl compound container", "hydrosilane transfer mechanism", "carbonyl compound transfer mechanism", "controller" and the like are specifically described.

Examples of the shape of the reactor include round-bottom, flat-bottom, and tubular forms.

The number of openings of the reactor generally ranges from 1 to 10.

Examples of the material of the reactor include glass, resin, and metal. In addition, the reactor may be a pressure-resistant container such as an autoclave.

The capacity of the reactor generally ranges from 5 to 500 ml.

Examples of the materials of the hydrosilane containers and the carbonyl compound containers include glass, resin, and metal.

The number of the hydrosilane containers is preferably 2 or more, more preferably 3 or more, further preferably 4 or more, and is generally 50 or less. The hydrosilane is a constituent of the siloxane structure of an oligosiloxane. Accordingly, if there are many hydrosilane containers, various substituents can be introduced into an oligosiloxane according to the number of the hydrosilane containers.

The number of the carbonyl compound container may be 1.

Examples of the hydrosilane transfer mechanism and the carbonyl compound transfer mechanism include an automatic injector using a syringe etc., in addition to those of the oligosiloxane synthesizer 101 in FIG. 1 using gas pressure.

Examples of a gas to be used for the hydrosilane transfer mechanism and the carbonyl compound transfer mechanism include inert gases such as a nitrogen gas and an argon gas.

When the hydrosilane transfer mechanism and the carbonyl compound transfer mechanism use liquid feed pipes as in the case of the oligosiloxane synthesizer 101 in FIG. 1, a liquid feed pipe may be directly connected to the reactor or connected to the same via an injector, a container or the like.

The synthesizer of the present invention may include, in addition to the reactor, the hydrosilane containers, the carbonyl compound container, the hydrosilane transfer mechanism, the carbonyl compound transfer mechanism, and the controller, a heating mechanism for heating within the reactor (hereinafter, sometimes abbreviated as "heating mechanism"), a stirring mechanism for stirring a reaction solution within the reactor (hereinafter, sometimes abbreviated as "stirring mechanism"), a boron compound container for storing a boron compound, a solvent container for storing a solvent, a boron compound transfer mechanism for transferring the boron compound from the boron compound container to the reactor, a solvent transfer mechanism for transferring the solvent from the solvent container to the reactor, a waste liquid container for storing a waste liquid, a waste liquid transfer mechanism for transferring the waste liquid from the reactor to the waste liquid container, a temperature sensor, a remaining quantity sensor, and the like.

Examples of the heating mechanism include a thermostat bath, an oil bath, and a mantle heater. Examples of the stirring mechanism include a stirring type mechanism, a stirring blade type mechanism, and a reactor reversing type mechanism. The oligosiloxane synthesizer 101 in FIG. 1 is equipped with a thermostat bath 110 as the heating mechanism and a stirrer 111 as the stirring mechanism.

When the oligosiloxane synthesizer is equipped with a heating mechanism, a stirring mechanism, and the like in addition to the hydrosilane transfer and carbonyl compound transfer mechanisms, the controller is preferably designed to be able to operate these mechanisms separately. These mechanisms can be operated, so that the controller can collectively manage the control of the entire oligosiloxane synthesizer.

Examples of the controller include computers, and more preferably commercially available personal computers.

A program for automatic synthesis control (hereinafter, sometimes abbreviated as "automatic synthesis control program") is preferably stored in the controller.

The automatic synthesis control program is preferably capable of setting so that each operation such as hydrosilane transfer, carbonyl compound transfer, heating within the reactor, stirring of a reaction solution and the like can be performed automatically according to conditions such as time. With such a program, a condensation reaction and a hydrosilylation reaction can be automatically performed alternately, and an oligosiloxane having arbitrary substituent sequences can be efficiently produced.

Second Embodiment of Oligosiloxane Synthesizer

Figure 2:
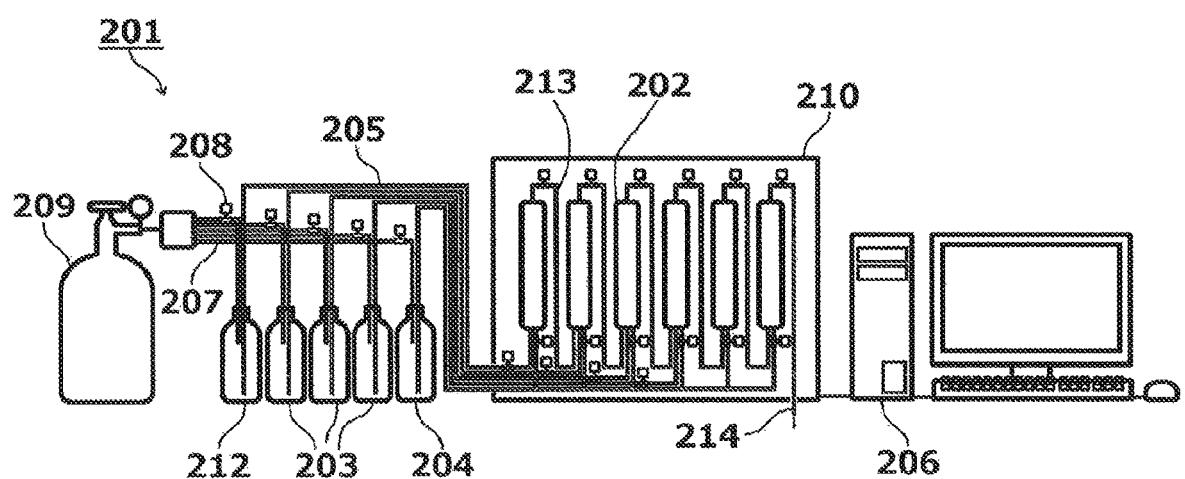
FIG. 2 is a schematic diagram depicting another embodiment of the oligosiloxane synthesizer that is an aspect of the present invention.

Another example of the synthesizer of the present invention is an oligosiloxane synthesizer having the configuration in FIG. 2.

An oligosiloxane synthesizer 201 in FIG. 2 is equipped with a plurality of reactors 202 for performing a condensation reaction and/or a hydrosilylation reaction, a plurality of hydrosilane containers 203 for storing a hydrosilane, a carbonyl compound container 204 for storing a carbonyl compound, liquid feed pipes 205 for transferring the hydrosilane from the hydrosilane containers 203 to the reactors 202 and the carbonyl compound from the carbonyl compound container 204 to the reactors 202, and a controller 206 for controlling the entire oligosiloxane synthesizer 201. Furthermore, the oligosiloxane synthesizer 201 is equipped with an alkoxysilane container 212, liquid feed pipes 213 for transferring a reaction product from a reactor to another reactor, and a recovery pipe 214 for recovering the thus generated oligosiloxane, and thus is namely a flow system capable of sequentially transferring a reaction product from a reactor to another reactor, and is capable of more efficiently producing oligosiloxanes continuously.

In addition, it can be said that the oligosiloxane synthesizer in FIG. 2 is equipped with an alkoxysilane container for storing an alkoxysilane, a reaction product transfer mechanism for transferring a reaction product from a reactor to another reactor, and an oligosiloxane transfer mechanism for transferring an oligosiloxane to the outside of the system.

<Oligosiloxane>

As described above, substituent sequences of an oligosiloxane can be precisely controlled by the production method of the present invention. The oligosiloxane represented by any one of the following Formulae (G-1) to (G-14), which can be produced by the production method of the present invention, is also an aspect of the present invention.

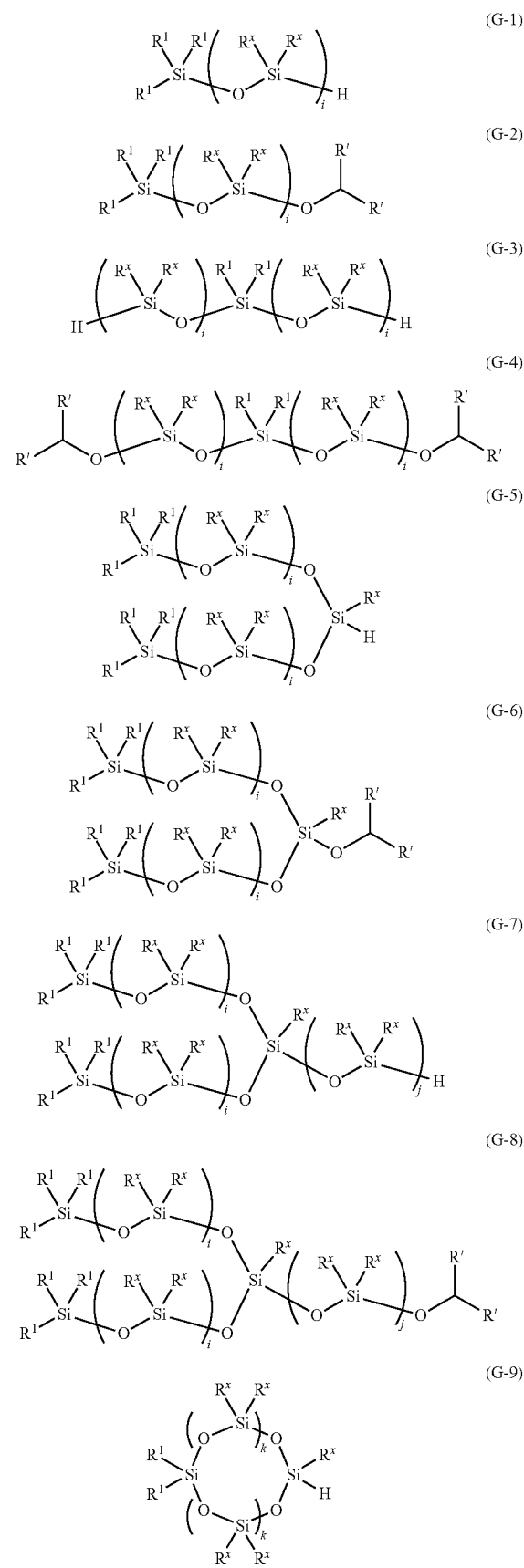

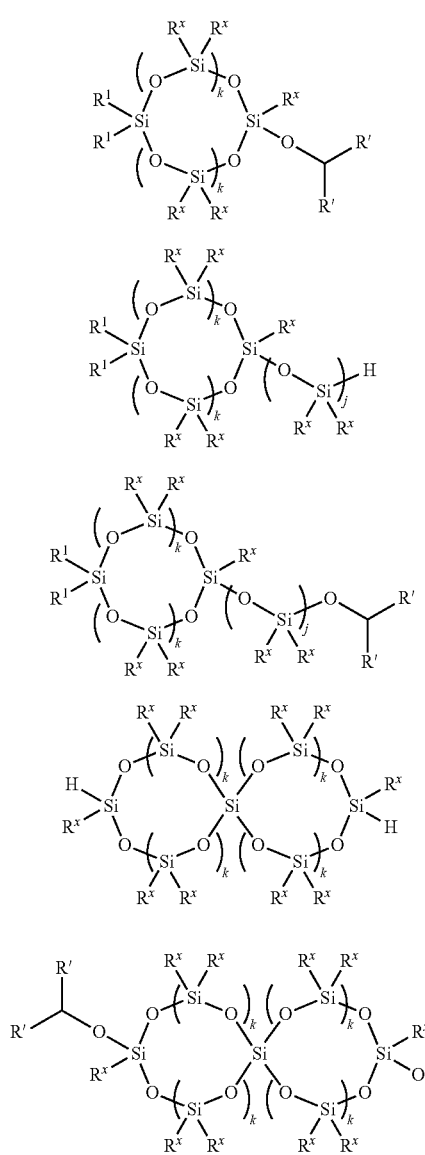

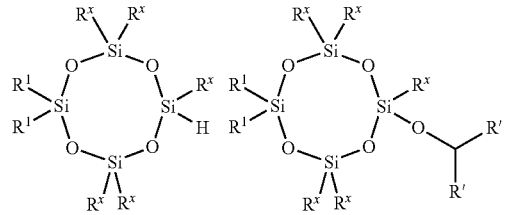
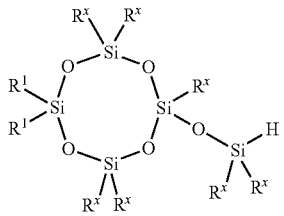
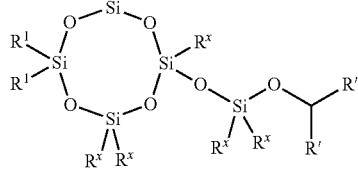
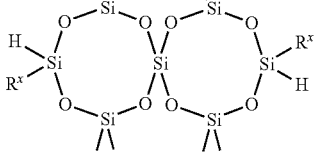
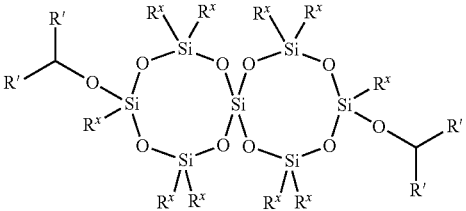
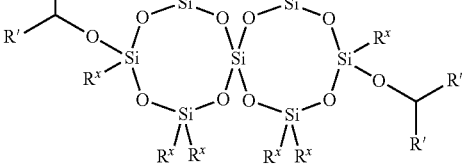
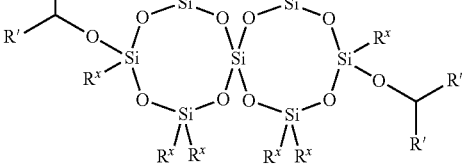

(In Formulae (G-1) to (G-14), R¹ each independently represents a C1-20 hydrocarbon group which may contain at least one type of atom selected from the group consisting of a nitrogen atom, an oxygen atom, a sulfur atom, and a halogen atom, R' each independently represents a hydrogen atom or a C1-8 hydrocarbon group, $R^x$ each independently represents a C1-20 hydrocarbon group which may contain at least one type of atom selected from the group consisting of a nitrogen atom, an oxygen atom, a sulfur atom, and a halogen atom, i represents an integer of 2-20, j represents an integer of 1-20, and k represents an integer of 1-20.)

Examples of R¹ in Formulae (G-1) to (G-14) include those similar to examples of R¹ in Formulae (B-1) to (B-4), and examples of R' in Formulae (G-2), (G-4), (G-6) and (G-8) include those similar to examples of R' in Formula (b).

Furthermore, at least one of siloxy groups (—$OSR^x_2$—) in Formulae (G-1) to (G-14) preferably differs from the other siloxy groups in the combination of hydrocarbon groups of $R^x$.

Furthermore, cyclic oligosiloxanes represented by Formulae (G-9) to (G-14) are preferably the following oligosiloxanes in view of the ease of cyclization.

EXAMPLES

The present invention will be described more specifically with reference to Examples as follows and can be changed as appropriate without departing from the spirit of the present invention. Accordingly, the following specific examples will not be construed as limiting the scope of the present invention.

Example 1

$B(C_6F_5)_3$ (5.1 mg, 0.01 mmol) was dissolved in toluene (1.0 mL). $Me_3SiO^iPr$ (35.5 μL, 0.20 mmol) and $Et_2SiH_2$ (26 μL, 0.20 mmol) were added sequentially to the solution and then the mixture was stirred. After 30 minutes, acetone (15 μL, 0.20 mmol) was added. After 30 minutes, $Et_2SiH_2$ (26 μL, 0.20 mmol) was added. After 30 minutes, acetone (15 μL, 0.20 mmol) was added. After 30 minutes, $Et_2SiH_2$ (26 μL, 0.20 mmol) was added. After 30 minutes, acetone (15 μL, 0.20 mmol) was added. After 30 minutes, $Ph_2SiH_2$ (37 μL, 0.20 mmol) was added. After 30 minutes, 3,3,5,5,7,7-hexaethyl-1,1,1-trimethyl-9,9-diphenyl pentasiloxane was generated in 83% yield as confirmed by ¹H NMR measurement.

¹H NMR (C₆D₆): 7.74-7.73 (m, 4H), 7.22-7.17 (m, 6H), 5.89 (s, 1H), 1.08-1.04 (m, 18H), 0.68 (q, J=8.0 Hz, 4H), 0.64 (q, J=8.0 Hz, 4H), 0.60 (q, J=8.0 Hz, 4H), 0.18 (s, 9H) ppm.

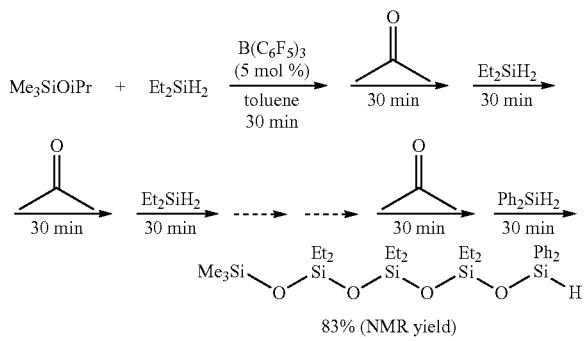

Example 2

B(C₆F₅)₃ (5.1 mg, 0.01 mmol) was dissolved in toluene (1.0 mL). Me₃SiO^iPr (35.5 μL, 0.20 mmol), Ph₂SiH₂ (37 μL, 0.20 mmol) were added sequentially to the solution and then the mixture was stirred. After 30 minutes, acetone (15 μL, 0.20 mmol) was added. After 30 minutes, Et₂SiH₂ (26 μL, 0.20 mmol) was added. After 30 minutes, acetone (15 μL, 0.20 mmol) was added. After 30 minutes, Et₂SiH₂ (26 μL, 0.20 mmol) was added. After 30 minutes, acetone (15 μL, 0.20 mmol) was added. After 30 minutes, Et₂SiH₂ (26 μL, 0.20 mmol) was added. After 30 minutes, 5,5,7,7,9,9-hexaethyl-1,1,1-trimethyl-3,3-diphenyl pentasiloxane was generated in 70% yield as confirmed by ¹H NMR measurement.

¹H NMR (C₆D₆): 7.85-7.83 (m, 4H), 7.26-7.19 (m, 6H), 4.85 (quintet, J=2.4 Hz, 1H), 1.08 (t, J=8.0 Hz, 6H), 1.05 (t, J=8.0 Hz, 6H), 1.02 (t, J=8.0 Hz, 6H), 0.73-0.59 (m, 12H), 0.18 (s, 9H) ppm.

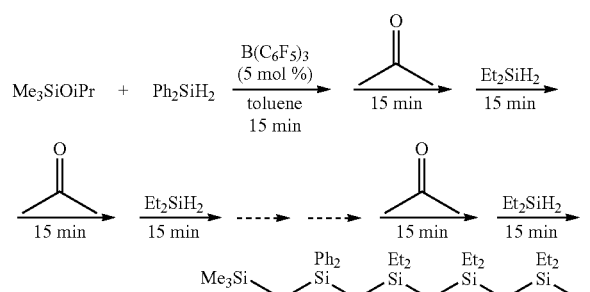

Example 3

B(C₆F₅)₃ (5.1 mg, 0.01 mmol) was dissolved in toluene (1.0 mL). Me₃SiO^iPr (35.5 μL, 0.20 mmol) and Ph₂SiH₂ (37 μL, 0.20 mmol) were added sequentially to the solution and then the mixture was stirred. After 30 minutes, acetone (15 μL, 0.20 mmol) was added. After 30 minutes, Ph₂SiH₂ (37 μL, 0.20 mmol) was added. After 30 minutes, acetone (15 μL, 0.20 mmol) was added. After 30 minutes, Et₂SiH₂ (26 μL, 0.20 mmol) was added. After 30 minutes, acetone (15 μL, 0.20 mmol) was added. After 30 minutes, Et₂SiH₂ (26 μL, 0.20 mmol) was added. After 30 minutes, 7,7,9,9-tetraethyl-1,1,1-trimethyl-3,3,5,5-tetraphenyl pentasiloxane was generated in 58% yield as confirmed by ¹H NMR measurement.

¹H NMR (C₆D₆): 7.88-7.86 (m, 4H), 7.82-7.80 (m, 4H), 7.21-7.17 (m, 12H), 4.79 (quintet, J=2.3 Hz, 1H), 0.98 (t, J=7.9 Hz, 6H), 0.96 (t, J=7.9 Hz, 6H), 0.61-0.55 (m, 8H), 0.09 (s, 9H) ppm.

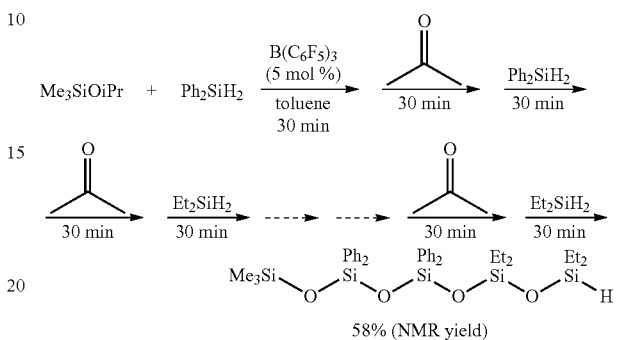

Example 4

B(C₆F₅)₃ (12.8 mg, 0.025 mmol) was dissolved in toluene (2.5 mL). Me₃SiO^iPr (88.2 μL, 0.50 mmol) and Ph₂SiH₂ (92.2 μL, 0.50 mmol) were added sequentially to the solution and then the mixture was stirred. After 15 minutes, acetone (36.8 μL, 0.50 mmol) was added. After 15 minutes, Et₂SiH₂ (64.9 μL, 0.50 mmol) was added. After 30 minutes, acetone (36.8 μL, 0.50 mmol) was added. After 30 minutes, 1,1-diethyl-1-isopropoxy-5,5,5-trimethyl-3,3-diphenyl trisiloxane was generated in 86% yield as confirmed by ¹HNMR measurement.

¹H NMR (C₆D₆): 7.84-7.83 (m, 4H), 4.13 (septet, J=6.1 Hz, 1H), 1.14 (d, J=6.1 Hz, 6H), 1.05 (t, J=7.9 Hz, 6H), 0.68 (q, J=7.9 Hz, 4H), 0.17 (s, 9H) ppm.

Subsequently, Ph₂SiH₂ (92.2 μL, 0.50 mmol) was added. After 30 minutes, acetone (36.8 μL, 0.50 mmol) was added and then the temperature was increased to 30° C. After 30 minutes, 3,3-diethyl-1-isopropoxy-7,7,7-trimethyl-1,1,5,5-tetraphenyl tetrasiloxane was generated in 74% yield as confirmed by ¹HNMR.

¹H NMR (C₆D₆): 7.84-7.82 (m, 4H), 7.81-7.79 (m, 4H), 4.23 (septet, J=6.1 Hz, 1H), 1.17 (d, J=6.1 Hz, 6H), 1.01 (t, J=8.0 Hz, 6H), 0.69 (q, J=8.0 Hz, 4H), 0.15 (s, 9H) ppm.

Furthermore, Et₂SiH₂ (64.9 μL, 0.50 mmol) was added. After 30 minutes, the catalyst was removed by silica gel column chromatography. The crude product was purified by recycling preparative GPC, thereby obtaining target 5,5,9,9-tetraethyl-1,1,1-trimethyl-3,3,7,7-tetraphenyl pentasiloxane in 70% yield.

¹H NMR (C₆D₆): 7.82-7.78 (m, 8H), 7.20-7.18 (m, 12H), 4.95 (quintet, J=2.3 Hz, 1H), 1.02 (t, J=8.0 Hz, 6H), 0.94 (t, J=8.0 Hz, 6H), 0.71 (q, J=8.0 Hz, 4H), 0.68-0.61 (m, 4H), 0.15 (s, 9H) ppm.

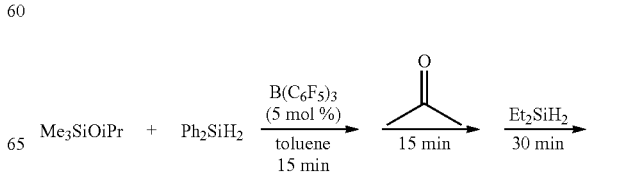

35

-continued

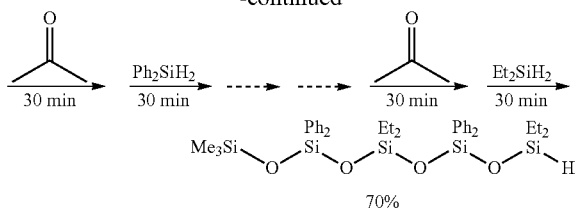

70%

Example 5

B(C$_6$F$_5$)$_3$ (5.1 mg, 0.01 mmol) was dissolved in toluene (1.0 mL). Me$_3$SiO$^i$Pr (35.5 µL, 0.20 mmol) and MePhSiH$_2$ (27.5 µL, 0.20 mmol) were added sequentially to the solution and then the mixture was stirred. After 30 minutes, acetone (15 µL, 0.20 mmol) was added. After 30 minutes, Ph$_2$SiH$_2$ (37 µL, 0.20 mmol) was added. After 30 minutes, acetone (15 µL, 0.20 mmol) was added. After 30 minutes, Et$_2$SiH$_2$ (26 µL, 0.20 mmol) was added. After 30 minutes, ethanol (15 µL, 0.20 mmol) was added. After 30 minutes, $^i$Pr$_2$SiH$_2$ (32.8 µL, 0.20 mmol) was added. After overnight stirring, 7,7-diethyl-9,9-diisopropyl-1,1,1,3-tetramethyl-3,5,5-triphenyl pentasiloxane was generated in 64% yield as confirmed by $^1$H NMR measurement.

$^1$H NMR (C$_6$D$_6$): 7.89-7.86 (m, 4H), 7.73-7.72 (m, 2H), 7.24-7.17 (m, 9H), 4.55 (t, J=1.8 Hz, 1H), 1.06-1.01 (m, 18H), 0.93-0.84 (m, 2H), 0.69-0.64 (m, 4H), 0.44 (s, 3H), 0.09 (s, 9H) ppm.

36

Example 6

B(C$_6$F$_5$)$_3$ (12.8 mg, 0.025 mmol) was dissolved in toluene (2.5 mL). 3-pentanone (94.5 µL, 0.90 mmol) and 1,1,3,3,5,5-hexamethyl trisiloxane (127.1 µL, 0.50 mmol) were added sequentially to the solution and then the mixture was stirred. After 30 minutes, Ph$_2$SiH$_2$ (147.4 µL, 0.80 mmol) was added. After 30 minutes, acetone (58.8 µL, 0.80 mmol) was added. After 30 minutes, Et$_2$SiH$_2$ (103.8 µL, 0.80 mmol) was added. After 30 minutes, acetone (58.8 µL, 0.80 mmol) was added. After 30 minutes, Et$_2$SiH$_2$ (103.8 µL, 0.80 mmol) was added. After 30 minutes, acetone (58.8 µL, 0.80 mmol) was added. After 30 minutes, Et$_2$SiH$_2$ (103.8 µL, 0.80 mmoll) was added. After 30 minutes, acetone (58.8 µL, 0.80 mmol) was added. After 30 minutes, the catalyst was removed by silica gel column chromatography. The crude product was purified by recycling preparative GPC, thereby obtaining target 1,1,3,3,5,5,17,17,19,19,21,21-dodecaethyl-1,21-diisopropoxy-9,9,11,11,13,13-hexamethyl-7,7,15,15-tetraphenyl undecasiloxane in 44% yield.

$^1$H NMR (C$_6$D$_6$): 7.89-7.88 (m, 8H), 7.27-7.25 (m, 8H), 7.23-7.20 (m, 4H), 4.14 (septet, J=6.1 Hz, 2H), 1.19 (d, J=6.1 Hz, 12H), 1.12-1.09 (m, 36H), 0.74 (q, J=8.0 Hz, 8H), 0.68-0.63 (m, 16H), 0.25 (s, 12H), 0.15 (s, 6H) ppm.

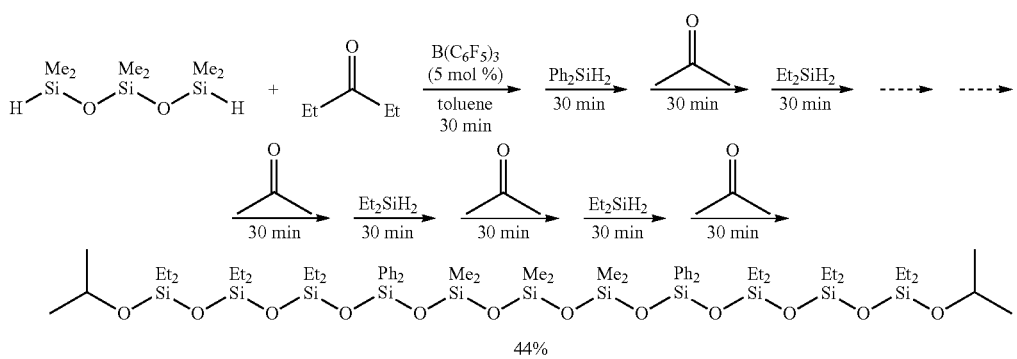

44%

Example 7

B(C$_6$F$_5$)$_3$ (12.8 mg, 0.025 mmol) was dissolved in toluene (2.5 mL). Me$_3$SiO$^i$Pr (88.2 µL, 0.50 mmol) and Ph$_2$SiH$_2$ (92.2 µL, 0.50 mmol) were added sequentially to the solution and then the mixture was stirred. After 30 minutes, acetone (36.8 µL, 0.50 mmol) was added. After 30 minutes, Et$_2$SiH$_2$ (64.9 µL, 0.50 mmol) was added. After 30 minutes, acetone (36.8 µL, 0.50 mmol) was added. After 30 minutes, PhSiH$_3$ (30.7 µL, 0.25 mmol) was added. After 30 minutes, the catalyst was removed by silica gel column chromatography. The crude product was purified by recycling preparative GPC, thereby obtaining target 5,5,9,9-tetraethyl-1,1,1,13,13,13-hexamethyl-3,3,7,11,11-pentaphenyl heptasiloxane in 61% yield.

$^1$H NMR (C$_6$D$_6$): 7.80-7.78 (m, 8H), 7.73-7.71 (m, 2H), 7.21-7.17 (m, 15H), 5.46 (s, 1H), 1.05 (t, J=8.0 Hz, 6H), 1.00 (t, J=8.0 Hz, 6H), 0.71 (q, J=8.0 Hz, 4H), 0.67 (q, J=8.0 Hz, 4H), 0.15 (s, 18H) ppm.

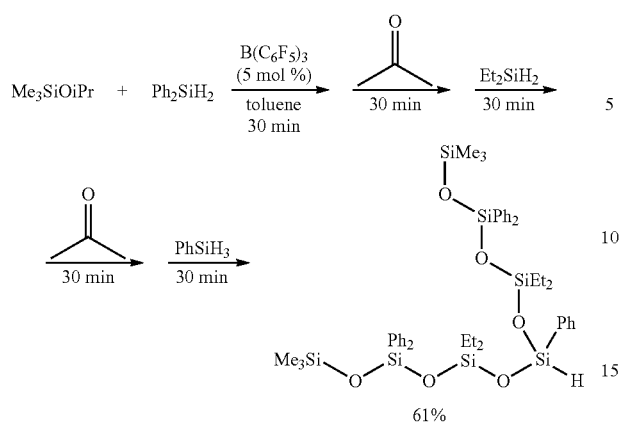

61%

Example 8

B(C$_6$F$_5$)$_3$ (12.8 mg, 0.025 mmol) was dissolved in toluene (2.5 mL). Me$_3$SiO$^i$Pr (88.2 µL, 0.50 mmol) and Et$_2$SiH$_2$ (64.9 µL, 0.50 mmol) were added sequentially to the solution and then the mixture was stirred. After 15 minutes, acetone (36.8 µL, 0.50 mmol) was added. After 15 minutes, PhSiH$_3$ (30.7 µL, 0.25 mmol) was added. After 30 minutes, acetone (18.4 µL, 0.25 mmol) was added and then the temperature was increased to 80° C. After 30 minutes, Et$_2$SiH$_2$ (32.4 µL, 0.25 mmoll) was added. After 3 hours, the reaction solution was left to stand to cool to room temperature, and then the catalyst was removed by silica gel column chromatography. The crude product was purified by recycling preparative GPC, thereby obtaining target 5-{(diethylsilyl)oxy}-3,3,7,7-tetraethyl-1,1,1,9,9,9-hexamethyl-5-phenyl pentasiloxane in 44% yield.

$^1$H NMR (C$_6$D$_6$): 7.94-7.92 (m, 2H), 7.28-7.26 (m, 2H), 7.22-7.19 (m, 1H), 4.94 (quintet, J=2.3 Hz, 1H), 1.10 (t, J=8.0 Hz, 6H), 1.09 (t, J=8.0 Hz, 6H), 1.05 (t, J=8.0 Hz, 6H), 0.80-0.66 (m, 12H), 0.18 (s, 18H) ppm.

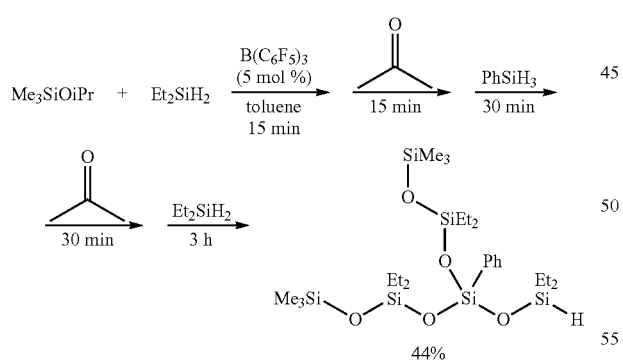

44%

Example 9

B(C$_6$F$_5$)$_3$ (10.2 mg, 0.02 mmol) was dissolved in toluene (5 mL). 3-pentanone (189 µL, 1.8 mmol) and HMe$_2$SiOSiMe$_2$OSiMe$_2$H (254 µL, 1.0 mmol) were added sequentially to the solution and then the mixture was stirred. After 30 minutes, PhSiH$_3$ (112 µL, 0.90 mmol) was added. After 30 minutes, the catalyst was removed by silica gel column chromatography. The crude product was purified by recycling preparative GPC, thereby obtaining target 2,2,4,4,6,6-hexamethyl-8-phenyl-1,3,5,7,2,4,6,8-tetraoxatetrasilocan in 37% yield.

$^1$H NMR (C$_6$D$_6$): 7.77-7.75 (m, 2H), 7.22-7.17 (m, 3H), 5.45 (s, 1H), 0.25 (s, 6H), 0.20 (s, 3H), 0.16 (s, 3H), 0.15 (s, 6H) ppm.

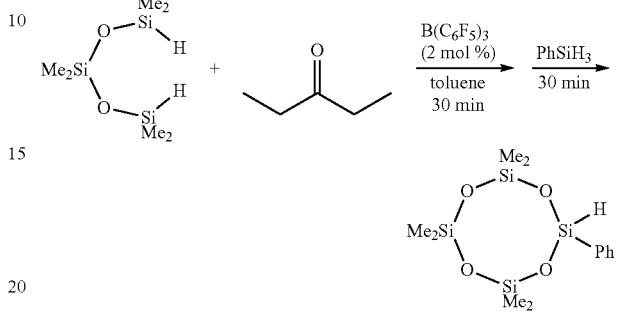

37%

Example 10

B(C$_6$F$_5$)$_3$ (6.3 mg, 0.013 mmol) was dissolved in toluene (4 mL). Acetone (74 µL, 1.0 mmol) and Si(OSiMe$_2$H)$_4$ (93 µL, 0.25 mmol) were added sequentially to the solution and then the mixture was stirred. After 30 minutes, PhSiH$_3$ (62 µL, 0.50 mmol) was added. After 60 minutes, acetone (37 µL, 0.50 mmol) was added. After 90 minutes, Et$_2$SiH$_2$ (72 µL, 0.55 mmoll) was added. After 60 minutes, the catalyst was removed by silica gel column chromatography. The crude product was purified by recycling preparative GPC, thereby obtaining target 4,12-bis((diethylsilyl)oxy)-2,2,6,6,10,10,14,14-octamethyl-4,12-diphenyl-1,3,5,7,9,11,13,15-octaoxa-2,4,6,8,10,12,14-heptasilaspiro[7.7] pentadecane in 44% yield.

$^1$H NMR (C$_6$D$_6$): 7.89-7.87 (m, 4H), 7.24-7.18 (m, 6H), 4.90 (quintet, J=2.3 Hz, 2H), 1.3 (t, J=8.0 Hz, 12H), 0.74-0.63 (m, 8H), 0.38 (s, 6H), 0.32 (s, 6H), 0.22 (s, 6H), 0.16 (s, 6H) ppm.

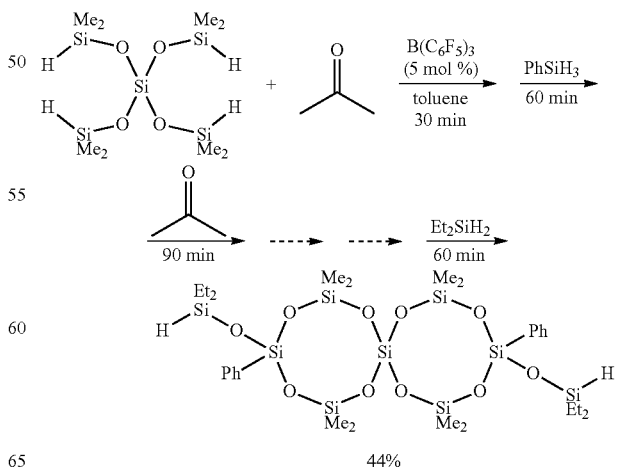

44%

INDUSTRIAL APPLICABILITY

Oligosiloxanes produced by the production method of the present invention can be used as silicone oil, silicone rubber and the like to be used for electronics, electric machines, automobiles, cosmetics, and the like.

REFERENCE SIGNS LIST 101 oligosiloxane synthesizer
102 reactor
103 hydrosilane container
104 carbonyl compound container
105 liquid feed pipe
106 controller
107 air feed pipe
108 electromagnetic valve
109 gas cylinder
110 thermostat bath
111 stirrer
201 oligosiloxane synthesizer
202 reactor
203 hydrosilane container
204 carbonyl compound container
205 liquid feed pipe
206 controller
207 air feed pipe
208 electromagnetic valve
209 gas cylinder
210 thermostat bath
212 alkoxysilane container
213 liquid feed pipe
214 recovery pipe

The invention claimed is:

1. A method for producing an oligosiloxane, comprising:
   a condensation step for generating a hydrosiloxane having a structure represented by Formula (d) by reacting an alkoxysilane having a structure represented by Formula (b) and a hydrosilane having a structure represented by Formula (c) in the presence of a boron compound having Lewis acidity; and
   a hydrosilylation step for generating an alkoxysiloxane having a structure represented by Formula (f) by reacting the hydrosiloxane having the structure represented by Formula (d) generated in the condensation step with a carbonyl compound represented by Formula (E) in the presence of a boron compound having Lewis acidity,

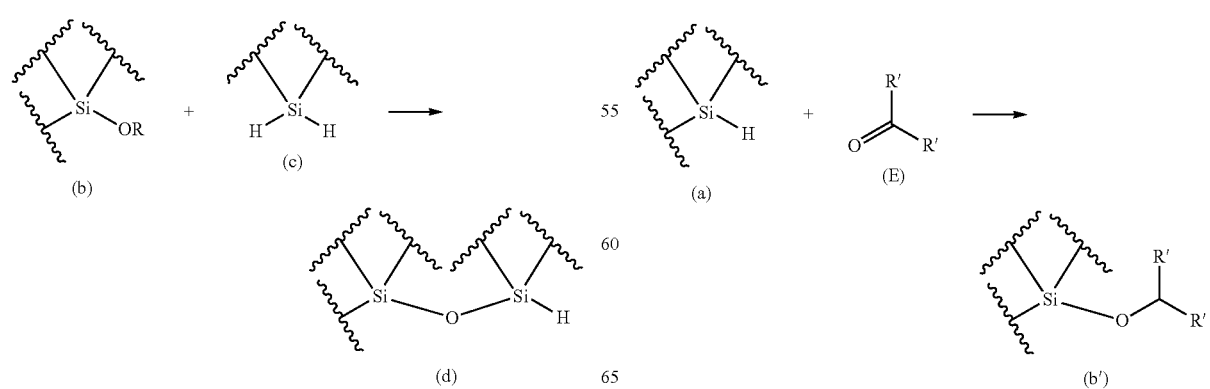

(b)   (c)   (d)

wherein in Formula (b), R represents a C1-20 hydrocarbon group or a group represented by —CHR'$_2$, and R' each independently represents a hydrogen atom or a C1-8 hydrocarbon group, wherein the structure represented by Formula (b) and the structure represented by Formula (c) may be each contained in different compounds or in one molecule, and

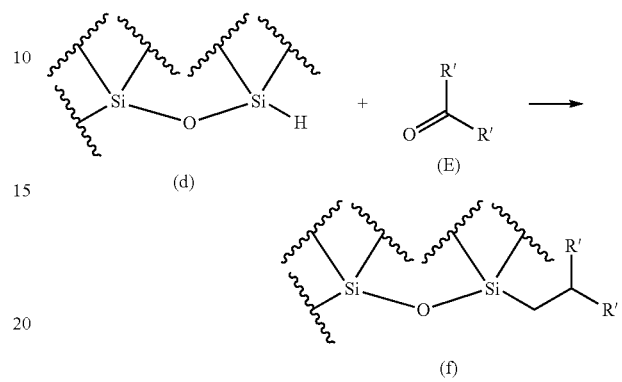

(d)   (E)   (f)

wherein in Formula (E) and Formula (f), R' each independently represents a hydrogen atom or a C1-8 hydrocarbon group, where two R's in Formula (E) and two R's in Formula (f) are the same combination.

2. The method for producing an oligosiloxane according to claim 1, wherein
   the alkoxysilane having the structure represented by Formula (b) is an alkoxysilane having a structure represented by Formula (b'),
   the alkoxysilane having the structure represented by Formula (b') is generated by reacting a hydrosilane having a structure represented by Formula (a) with a carbonyl compound represented by Formula (E) in the presence of a boron compound having Lewis acidity,

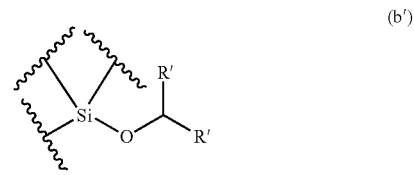

(b')

wherein in Formula (b'), R' each independently represents a hydrogen atom or a C1-8 hydrocarbon group, and (a)   (E)   (b')

wherein in Formula (E) and Formula (b'), R' each independently represents a hydrogen atom or a C1-8 hydrocarbon group, where two R's in Formula (E) and two R' in Formula (b') are the same combination.

3. A method for producing an oligosiloxane, comprising:
a hydrosilylation step for generating an alkoxysilane having a structure represented by Formula (b') by reacting a hydrosilane having a structure represented by Formula (a) with a carbonyl compound represented by Formula (E) in the presence of a boron compound having Lewis acidity; and
a condensation step for generating a hydrosiloxane having a structure represented by Formula (d) by reacting the alkoxysilane having the structure represented by Formula (b') generated in the hydrosilylation step with a hydrosilane having a structure represented by Formula (c) in the presence of a boron compound having Lewis acidity,

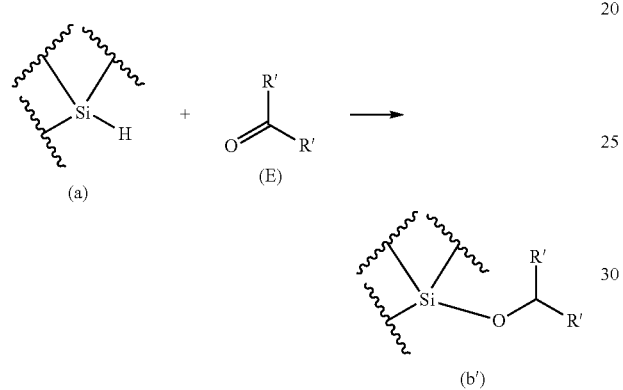

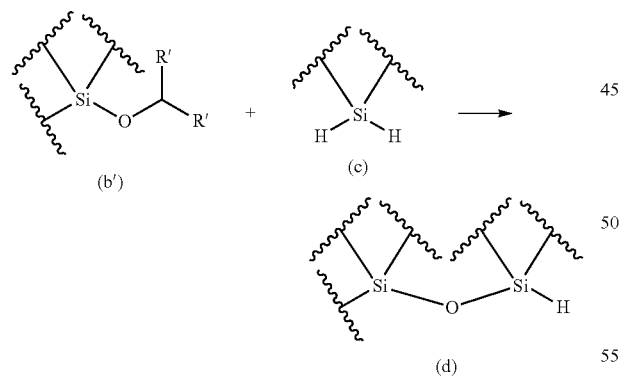

wherein in Formula (E) and Formula (b'), R' each independently represents a hydrogen atom or a C1-8 hydrocarbon group, where two R's in Formula (E) and two R' in Formula (b') are the same combination, and wherein the structure represented by Formula (b') and the structure represented by Formula (c) may be each contained in different compounds or in one molecule.

4. The method for producing an oligosiloxane according to claim 1, wherein the condensation step and the hydrosilylation step are performed within one reactor.

5. The method for producing an oligosiloxane according to claim 1, wherein the boron compound having Lewis acidity used in the condensation step is used in the hydrosilylation step.

6. The method for producing an oligosiloxane according to claim 4, wherein the boron compound having Lewis acidity used in the hydrosilylation step is used in the condensation step.

7. The method for producing an oligosiloxane according to claim 1, wherein the oligosiloxane is represented by any one of Formulae (G-1) to (G-14),

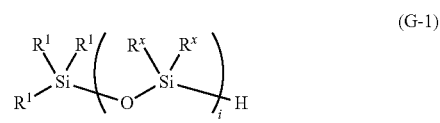

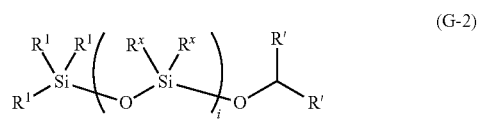

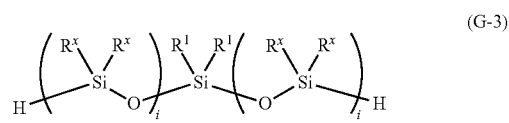

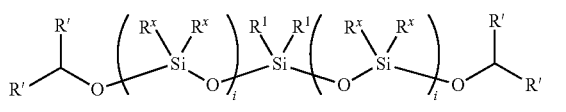

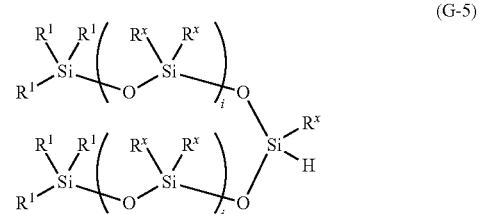

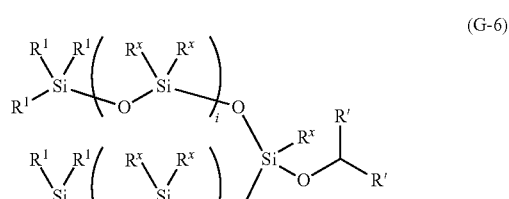

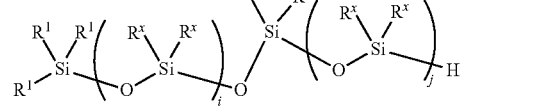

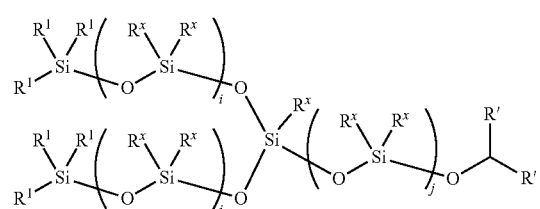

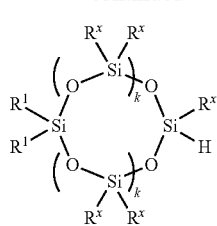
(G-9)

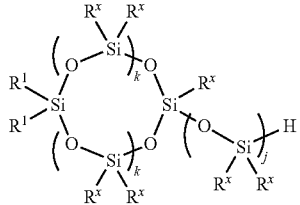
(G-10)

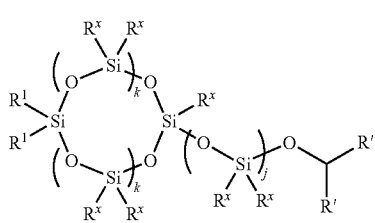
(G-11)

(G-12)

(G-13)

(G-14)

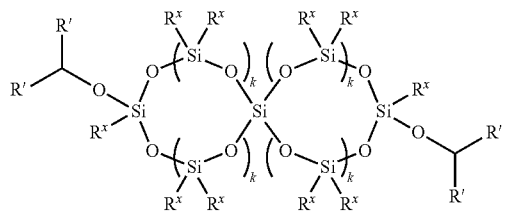

wherein in Formulae (G-1) to (G-14), $R^1$ each independently represents a C1-20 hydrocarbon group which may contain at least one type of atom selected from the group consisting of a nitrogen atom, an oxygen atom, a sulfur atom, and a halogen atom, R' each independently represents a hydrogen atom or a C1-8 hydrocarbon group, $R^x$ each independently represents a C1-20 hydrocarbon group which may contain at least one type of atom selected from the group consisting of a nitrogen atom, an oxygen atom, a sulfur atom, and a halogen atom, i represents an integer of 2-20, j represents an integer of 1-20, and k represents an integer of 1-20.

8. The method for producing an oligosiloxane according to claim 1, comprising the two or more condensation steps and the two or more hydrosilylation steps, wherein the condensation step and the hydrosilylation step are performed alternately.

9. The method for producing an oligosiloxane according to claim 2, wherein the condensation step and the hydrosilylation step are performed within one reactor.

10. The method for producing an oligosiloxane according to claim 9, wherein the boron compound having Lewis acidity used in the condensation step is used in the hydrosilylation step.

11. The method for producing an oligosiloxane according to claim 10, wherein the oligosiloxane is represented by any one of Formulae (G-1) to (G14),

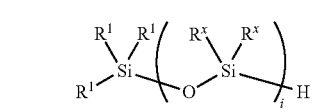
(G-1)

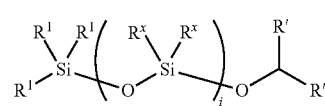
(G-2)

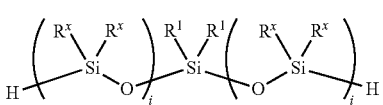
(G-3)

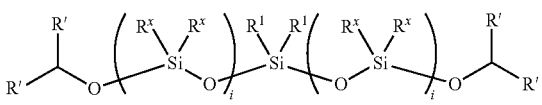
(G-4)

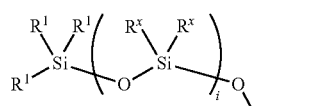
(G-5)

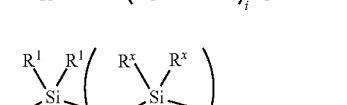
(G-6)

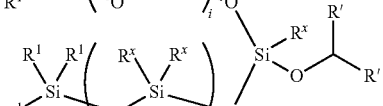
(G-7)

-continued

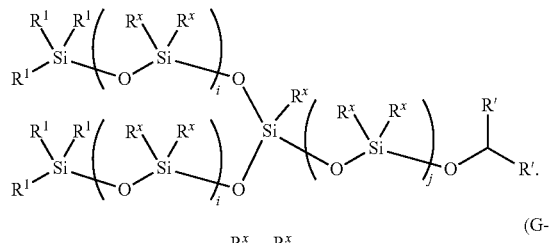
(G-8)

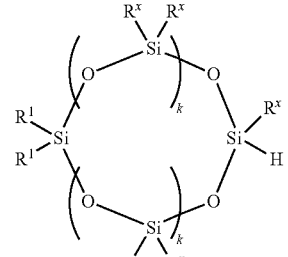
(G-9)

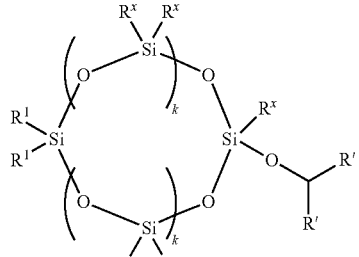
(G-10)

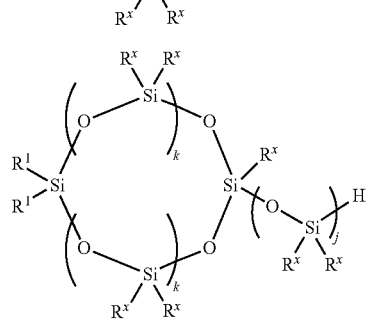
(G-11)

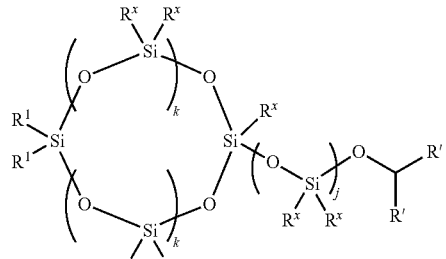
(G-12)

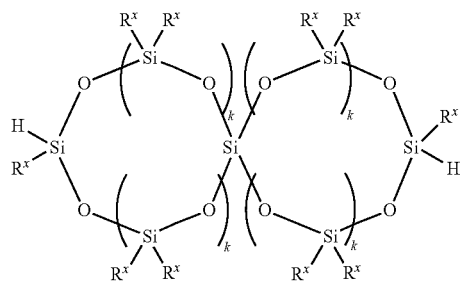
(G-13)

-continued

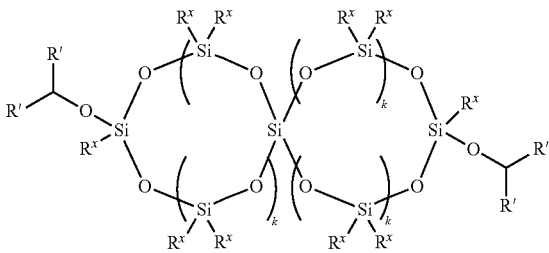
(G-14)

wherein in Formulae (G-1) to (G-14), $R^1$ each independently represents a C1-20 hydrocarbon group which may contain at least one type of atom selected from the group consisting of a nitrogen atom, an oxygen atom, a sulfur atom, and a halogen atom, R' each independently represents a hydrogen atom or a C1-8 hydrocarbon group, $R^x$ each independently represents a C1-20 hydrocarbon group which may contain at least one type of atom selected from the group consisting of a nitrogen atom, an oxygen atom, a sulfur atom, and a halogen atom, i represents an integer of 2-20, j represents an integer of 1-20, and k represents an integer of 1-20.

12. The method for producing an oligosiloxane according to claim 10, wherein the oligosiloxane is represented by any one of Formulae (G-1) to (G-14),

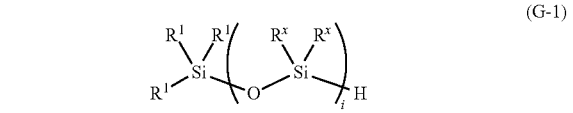
(G-1)

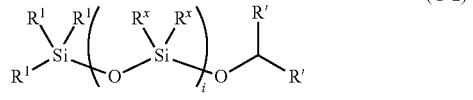
(G-2)

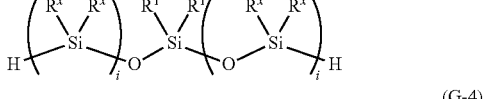
(G-3)

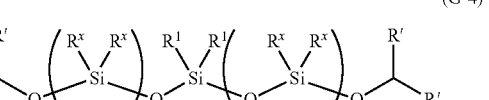
(G-4)

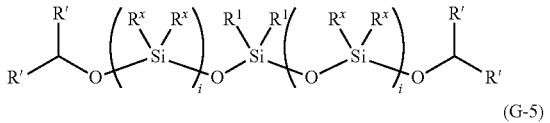
(G-5)

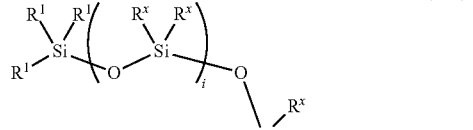
(G-6)

-continued

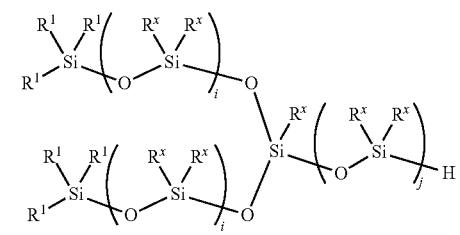
(G-7)

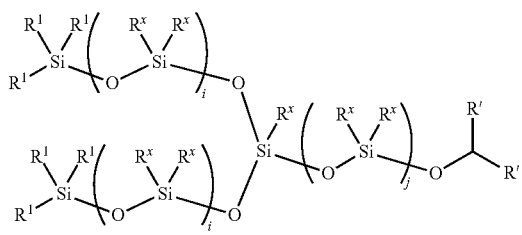
(G-8)

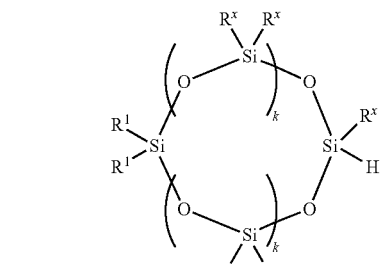
(G-9)

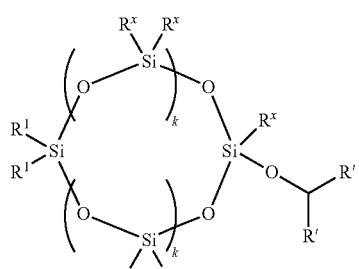
(G-10)

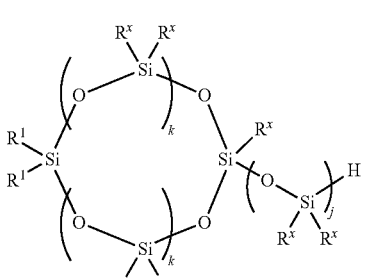
(G-11)

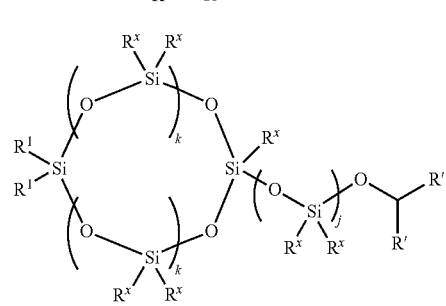
(G-12)

-continued

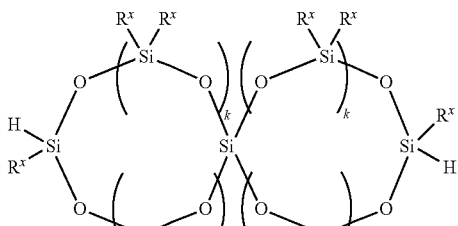
(G-13)

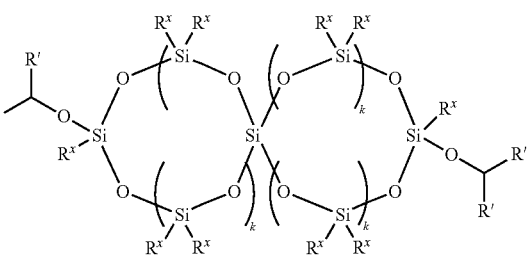
(G-14)

wherein in Formulae (G-1) to (G-14), $R^1$ each independently represents a C1-20 hydrocarbon group which may contain at least one type of atom selected from the group consisting of a nitrogen atom, an oxygen atom, a sulfur atom, and a halogen atom, R' each independently represents a hydrogen atom or a C1-8 hydrocarbon group, $R^x$ each independently represents a C1-20 hydrocarbon group which may contain at least one type of atom selected from the group consisting of a nitrogen atom, an oxygen atom, a sulfur atom, and a halogen atom, i represents an integer of 2-20, j represents an integer of 1-20, and k represents an integer of 1-20.

13. The method for producing an oligosiloxane according to claim 3, wherein the boron compound having Lewis acidity used in the hydrosilylation step is used in the condensation step.

14. The method for producing an oligosiloxane according to claim 3, wherein the oligosiloxane is represented by any one of Formulae (G-1) to (G-14),

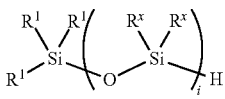
(G-1)

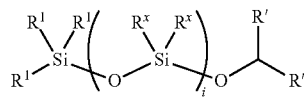
(G-2)

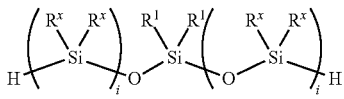
(G-3)

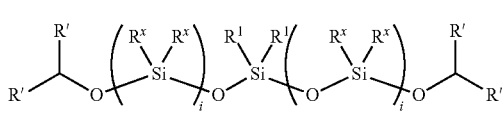
(G-4)

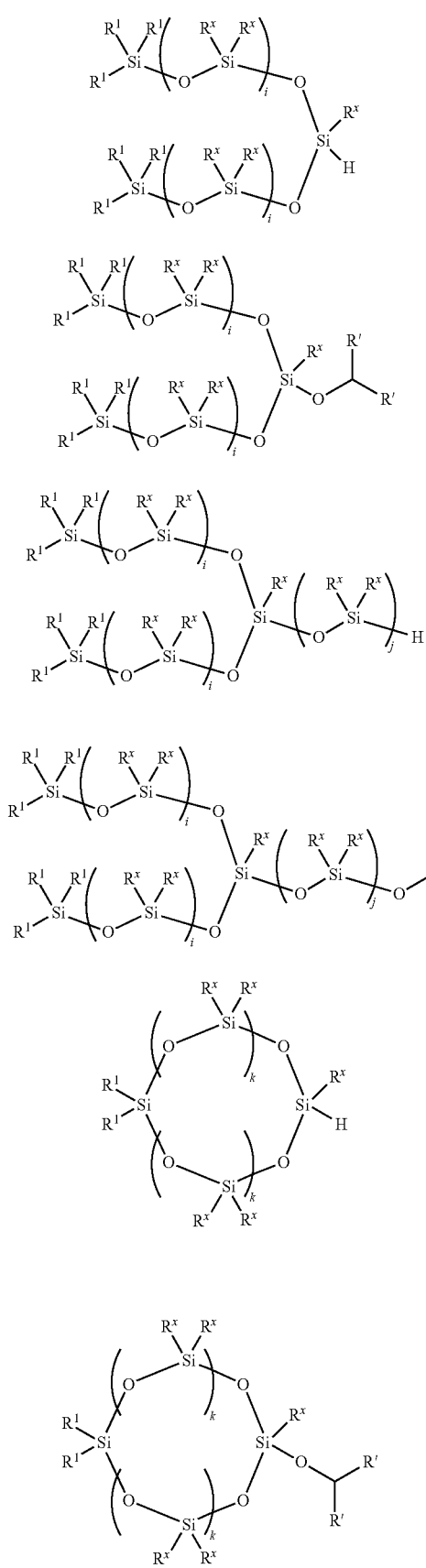

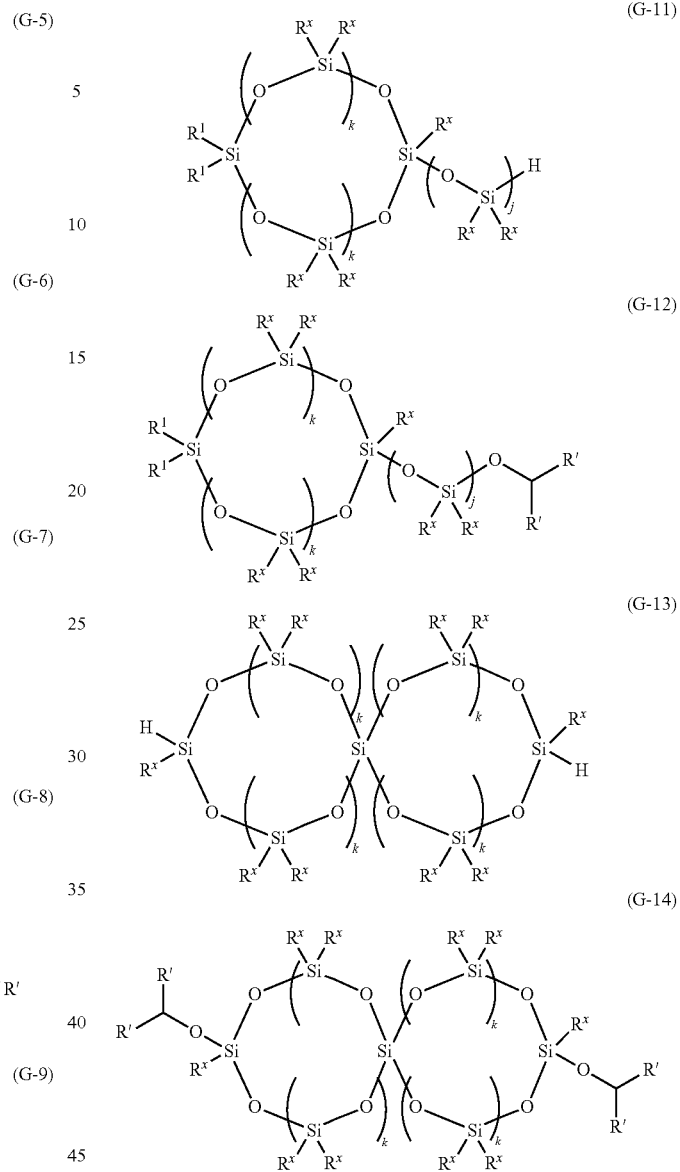

wherein in Formulae (G-1) to (G-14), $R^1$ each independently represents a C1-20 hydrocarbon group which may contain at least one type of atom selected from the group consisting of a nitrogen atom, an oxygen atom, a sulfur atom, and a halogen atom, R' each independently represents a hydrogen atom or a C1-8 hydrocarbon group, $R^x$ each independently represents a C1-20 hydrocarbon group which may contain at least one type of atom selected from the group consisting of a nitrogen atom, an oxygen atom, a sulfur atom, and a halogen atom, i represents an integer of 2-20, j represents an integer of 1-20, and k represents an integer of 1-20.

15. The method for producing an oligosiloxane according to claim 3, wherein the condensation step and the hydrosilylation step are performed within one reactor.

16. The method for producing an oligosiloxane according to claim 15, wherein the boron compound having Lewis acidity used in the hydrosilylation step is used in the condensation step.

17. The method for producing an oligosiloxane according to claim 16, wherein the oligosiloxane is represented by any one of Formulae (G-1) to (G-14),

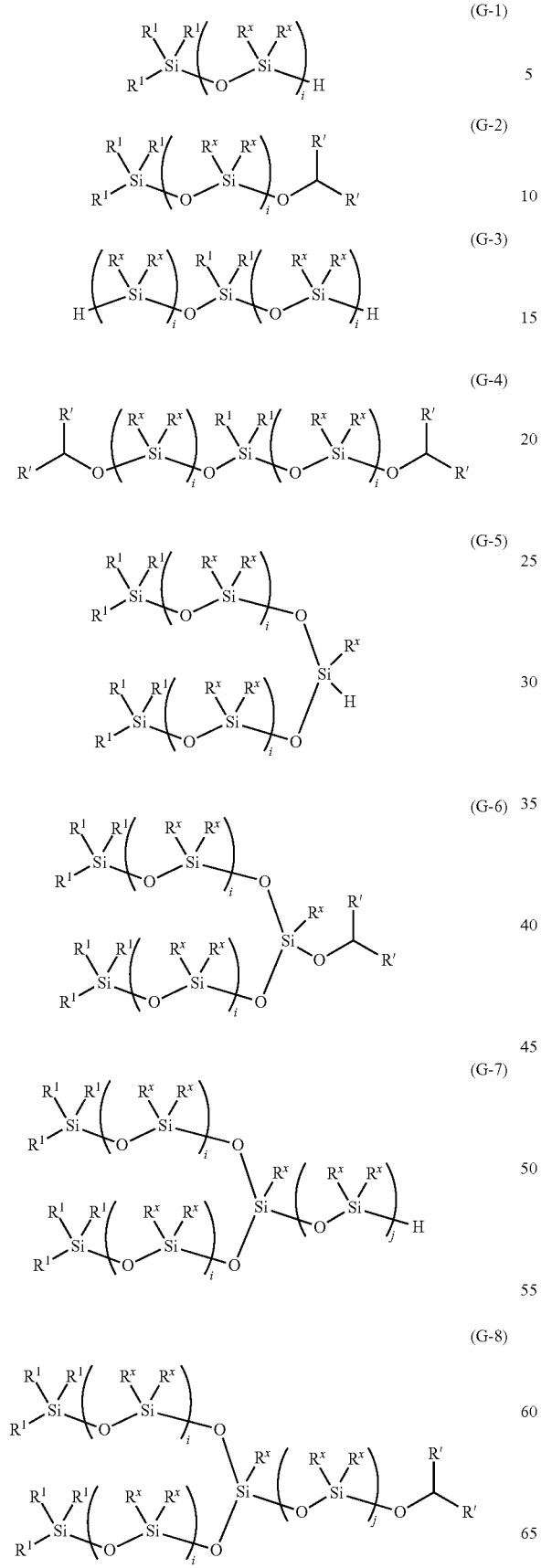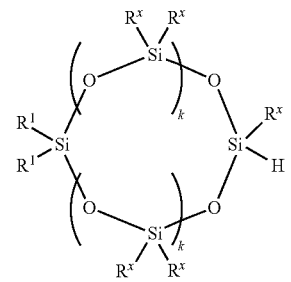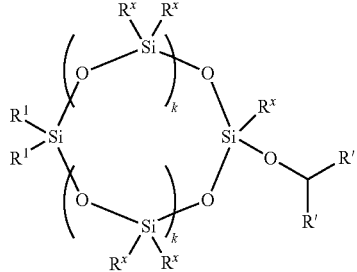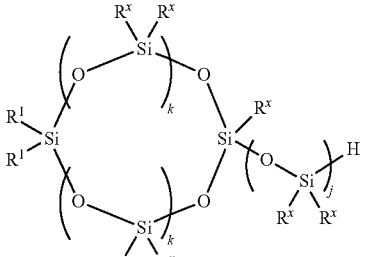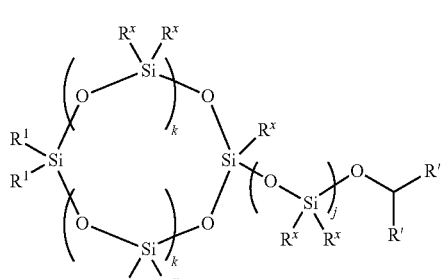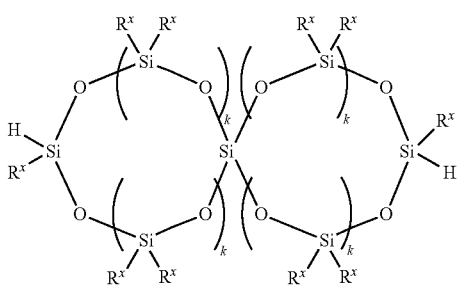

(G-14)

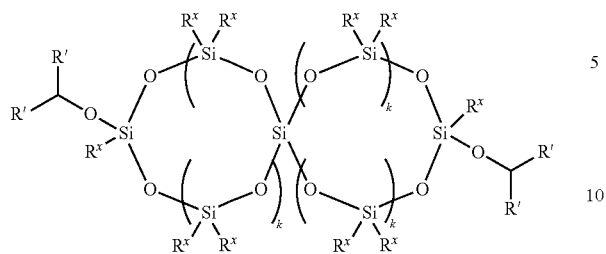

wherein in Formulae (G-1) to (G-14), $R^1$ each independently represents a C1-20 hydrocarbon group which may contain at least one type of atom selected from the group consisting of a nitrogen atom, an oxygen atom, a sulfur atom, and a halogen atom, R' each independently represents a hydrogen atom or a C1-8 hydrocarbon group, $R^x$ each independently represents a C1-20 hydrocarbon group which may contain at least one type of atom selected from the group consisting of a nitrogen atom, an oxygen atom, a sulfur atom, and a halogen atom, i represents an integer of 2-20, j represents an integer of 1-20, and k represents an integer of 1-20.

* * * * *

UNITED STATES PATENT AND TRADEMARK OFFICE
CERTIFICATE OF CORRECTION

PATENT NO. : 10,975,107 B2
APPLICATION NO. : 16/490761
DATED : April 13, 2021
INVENTOR(S) : Kazuhiro Matsumoto et al.

Page 1 of 3

It is certified that error appears in the above-identified patent and that said Letters Patent is hereby corrected as shown below:

In the Claims

In Claim 1 at Column 40, Line 16, replace formula (f):

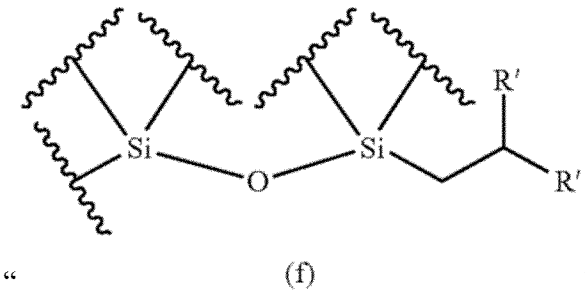

" (f) "

With the following replacement formula (1):

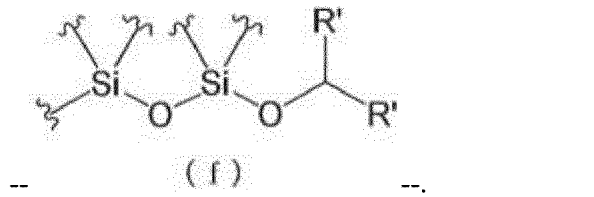

-- ( f ) --.

In Claim 11 at Column 46, Line 1, replace formula (G-14):
-continued
(G-14)

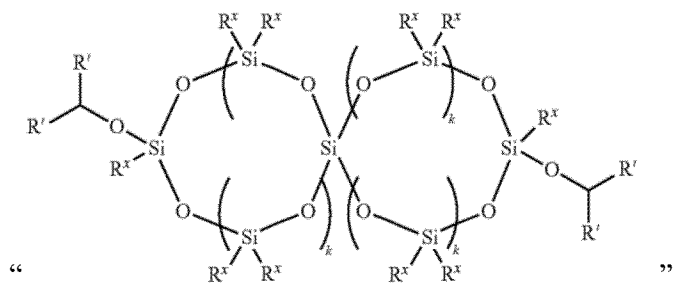

Signed and Sealed this
Fifth Day of October, 2021

Drew Hirshfeld
*Performing the Functions and Duties of the
Under Secretary of Commerce for Intellectual Property and
Director of the United States Patent and Trademark Office*

With the following replacement formula (G-14):
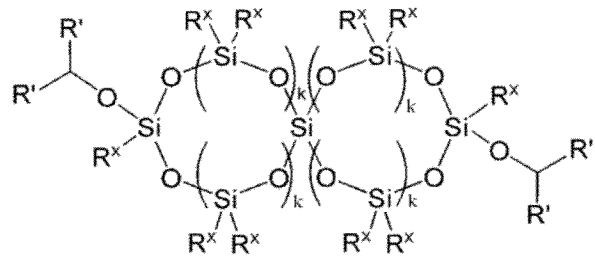
-- (G-14) --.
In Claim 12 at Column 46, Line 26, change "claim 10" to --claim 4--.
In Claim 12 at Column 48, Line 15, replace formula (G-14):
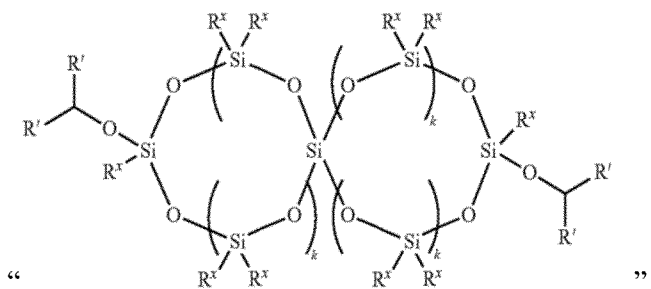
" (G-14) "
With the following replacement formula (G-14):
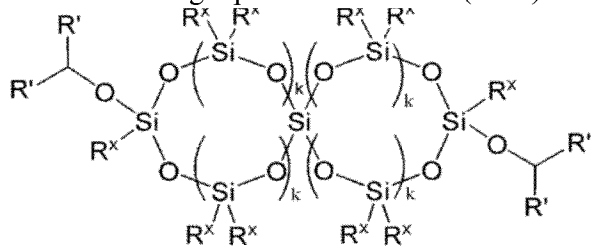
-- (G-14) --.
In Claim 14 at Column 50, Line 36, replace formula (G-14):
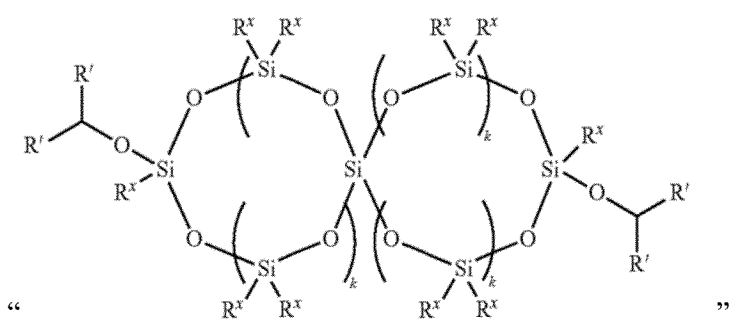
" (G-14) "

CERTIFICATE OF CORRECTION (continued)
U.S. Pat. No. 10,975,107 B2

With the following replacement formula (G-14):

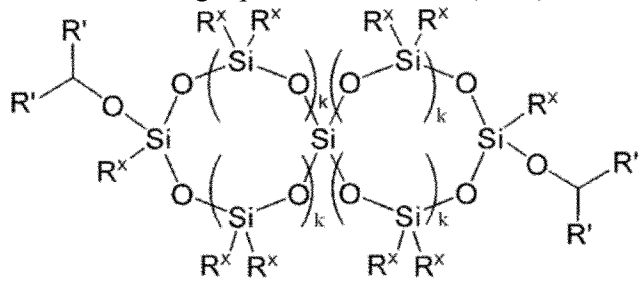

-- (G−1 4) --.

In Claim 17 at Column 53, Line 1, replace formula (G-14):

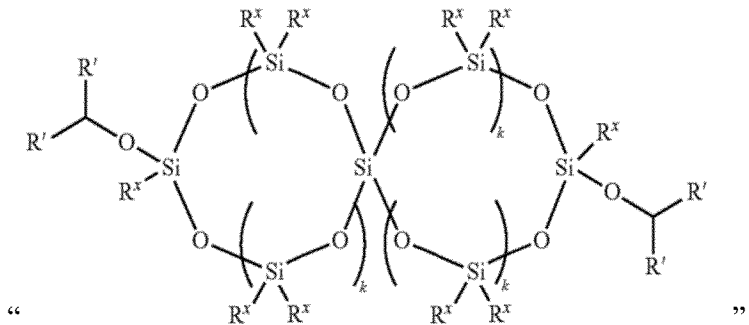

With the following replacement formula (G-14):

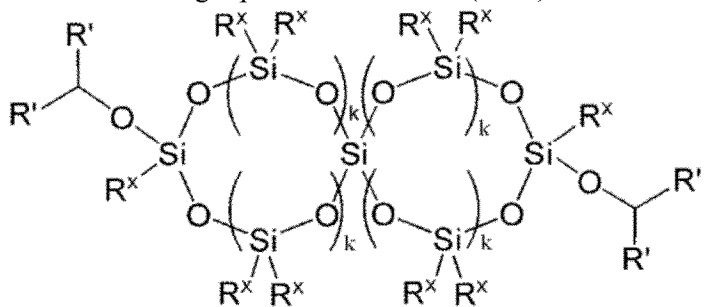

-- (G−1 4) --.